United States Patent [19]

Nado et al.

[11] Patent Number: 4,918,621

[45] Date of Patent: Apr. 17, 1990

[54] METHOD FOR REPRESENTING A DIRECTED ACYCLIC GRAPH OF WORLDS USING AN ASSUMPTION-BASED TRUTH MAINTENANCE SYSTEM

[75] Inventors: Robert A. Nado; Paul H. Morris, both of Mountain View, Calif.

[73] Assignee: IntelliCorp, Inc., Mountain View, Calif.

[21] Appl. No.: 285,323

[22] Filed: Dec. 13, 1988

Related U.S. Application Data

[63] Continuation of Ser. No. 896,543, Aug. 13, 1986, abandoned.

[51] Int. Cl.$^4$ .............................................. G06F 15/18
[52] U.S. Cl. .................................... 364/513; 364/200
[58] Field of Search ........ 364/513, 300, 200 MS File, 364/900 MS File

[56] References Cited

U.S. PATENT DOCUMENTS 4,675,829 6/1987 Clemenson ........................ 364/513

OTHER PUBLICATIONS

Rich, Elaine, "Artificial Intelligence," McGraw-Hill, 1983, pp. 173–197.
Johan de Kleer, "An Assumption-Based TMS", Artificial Intelligence, vol. 28, 1986 pp. 127–162.
Handbook of Artificial Intelligence, vol. 1, edited by Avram Barr and Edward Feigembaum (William A. Caufmann, Inc., Los Altos, CA, 1981) pp. 36–37, 72–76.

Primary Examiner—Allen MacDonald
Attorney, Agent, or Firm—Townsend and Townsend

[57] ABSTRACT

In artificial intelligence, a method is provided for representing a directed acyclic graph of worlds using an assumption-based truth maintenance system (ATMS) as a tool. The invention introduces the concepts of a non-deletion assumption and a deletion nogood, in order to allow deletion of an assertion upon transition between worlds. The traditional (de Kleer) ATMS tool is augmented to allow distinction between two kinds of assumptions, namely the nondeletion assumption and the world assumption. The nondeletion assumption is the elementary stipulation indicating the presence of an added assertion in a world. The world assumption is the elementary stipulation representing existence of a world. According to the invention, a method for testing assertions is provided for determining whether an assertion holds in a world. The method involves taking into account the presence of deletion nogoods relevant to the tested assertion. A deletion nogood is a nogood which indicates the contradiction between a world assumption and a nondeletion assumption which arises from a deletion of an assertion. Deletion nogoods are introduced at a world to block any further inheritance of an assertion from an ancestor world. The ATMS tool is further modified by replacing the traditional ATMS notion of inconsistency with a concept of inconsistency wherein only world assumptions are blamed for inconsistencies. The present invention may be used in connection with planning systems and diagnosis systems as well as with other types of knowledge-based systems.

10 Claims, 10 Drawing Sheets

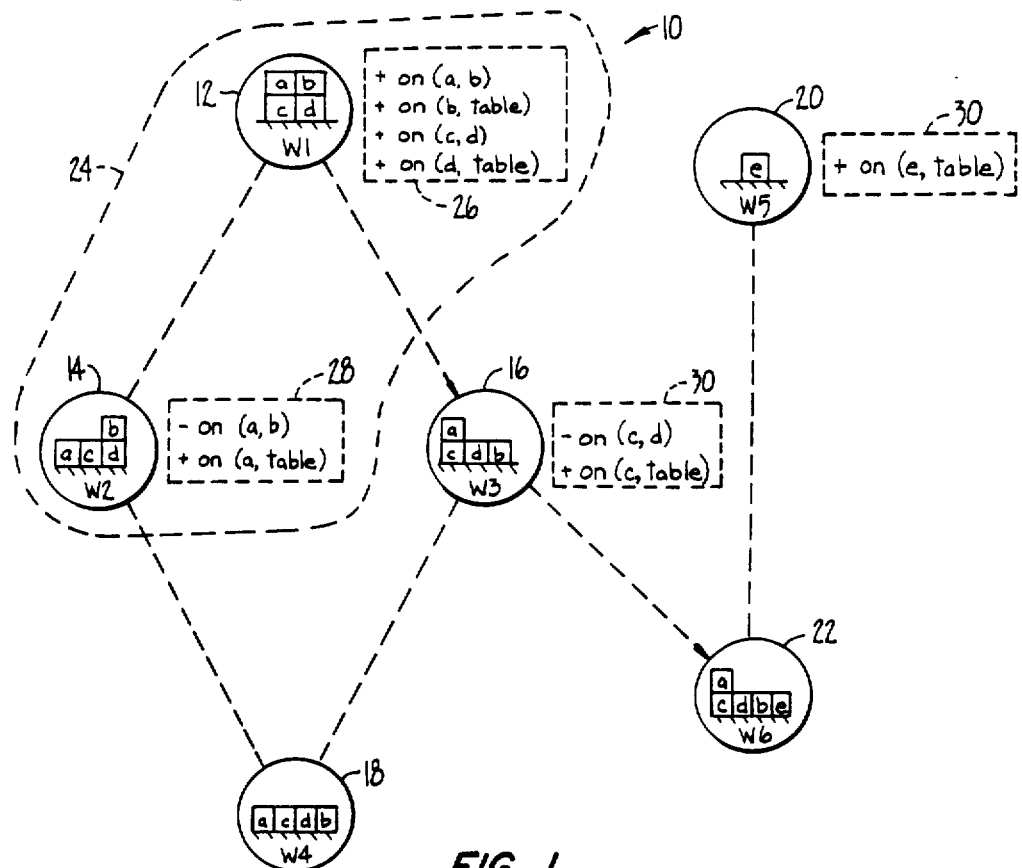
FIG._1.
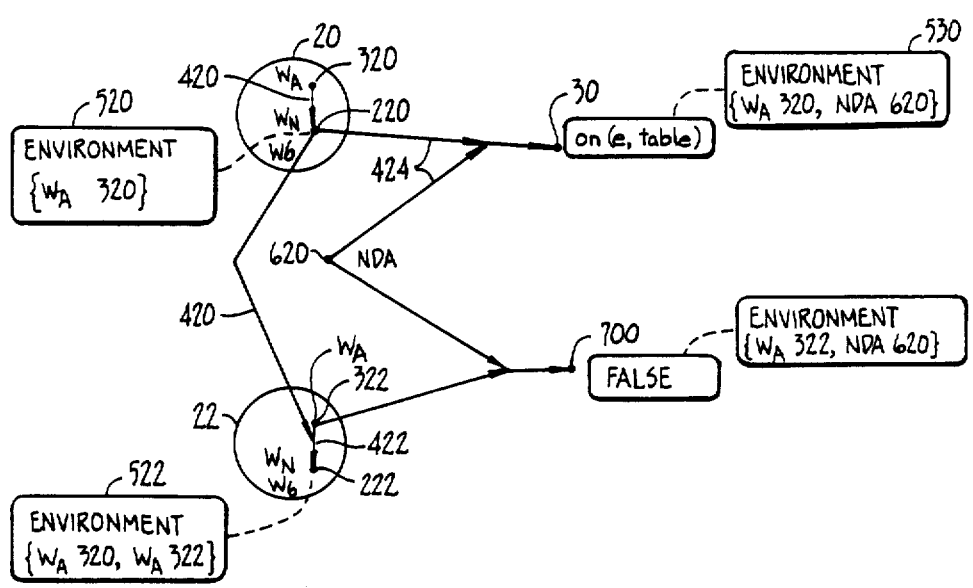
FIG._2.

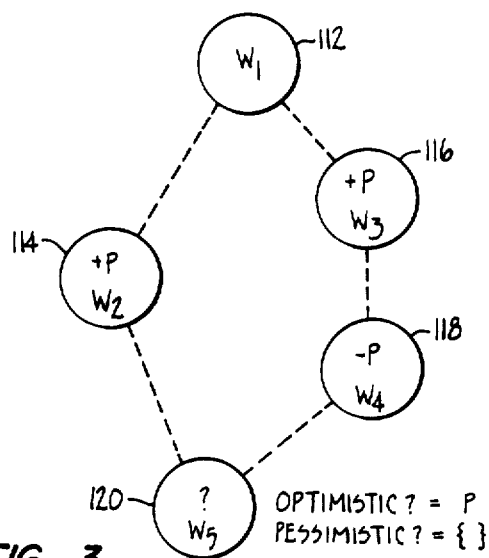
FIG._3.
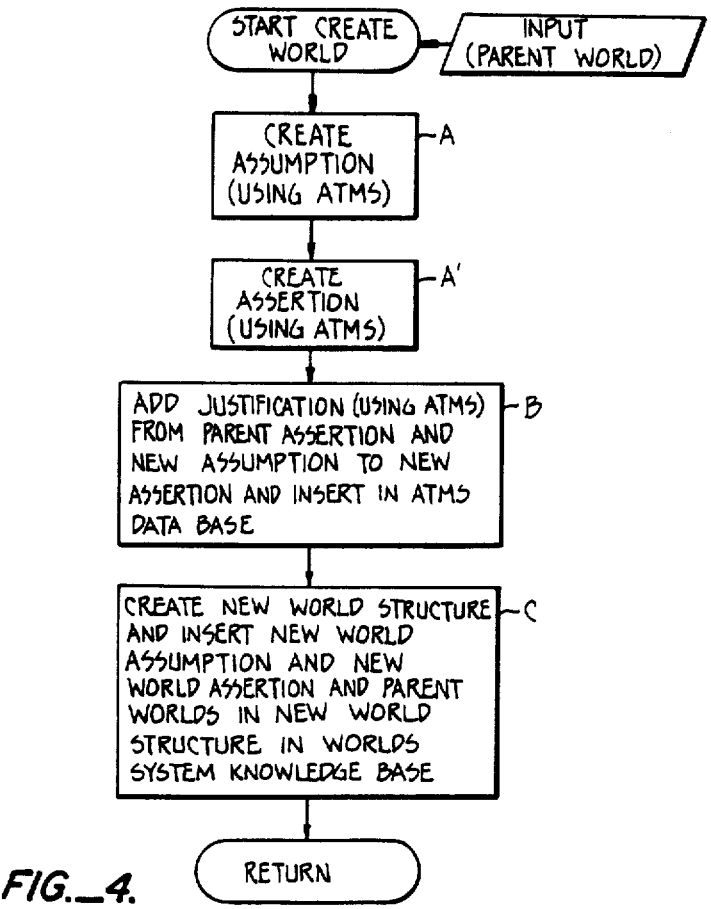
FIG._4.

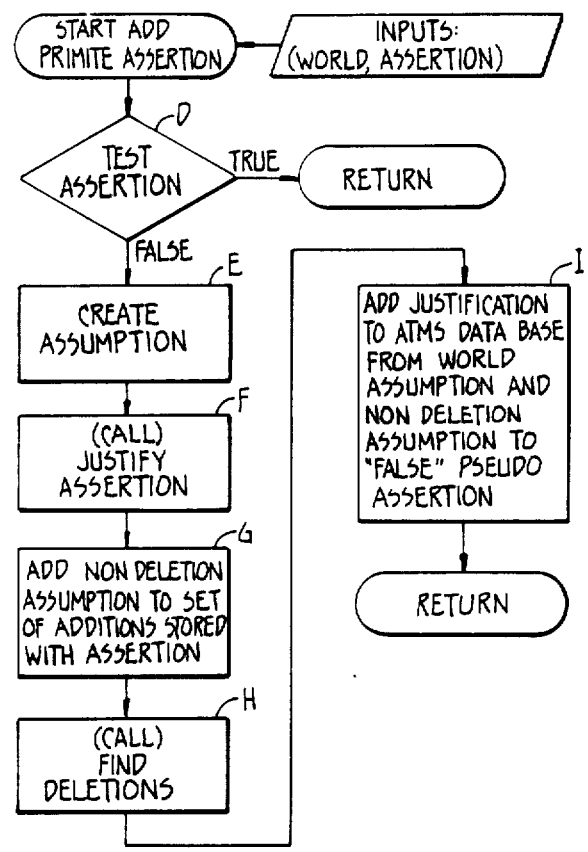
FIG._5.

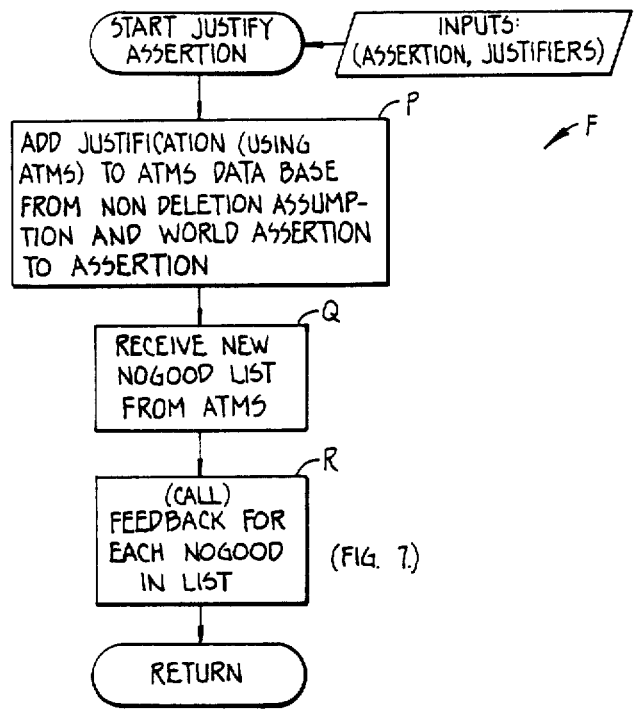
FIG._6.
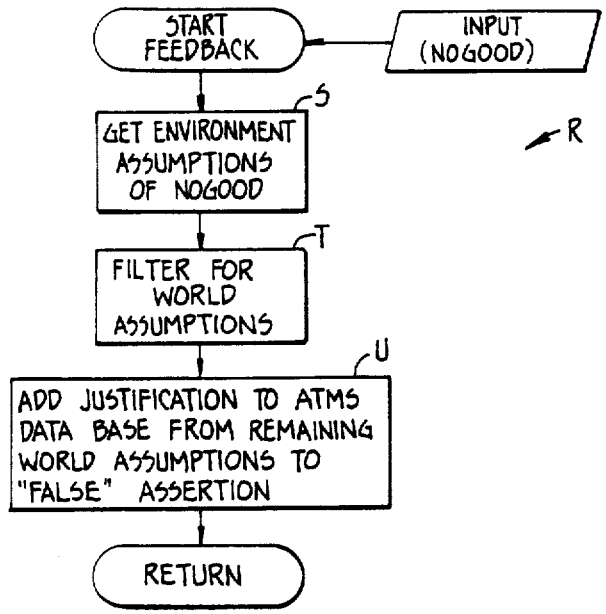
FIG._7.

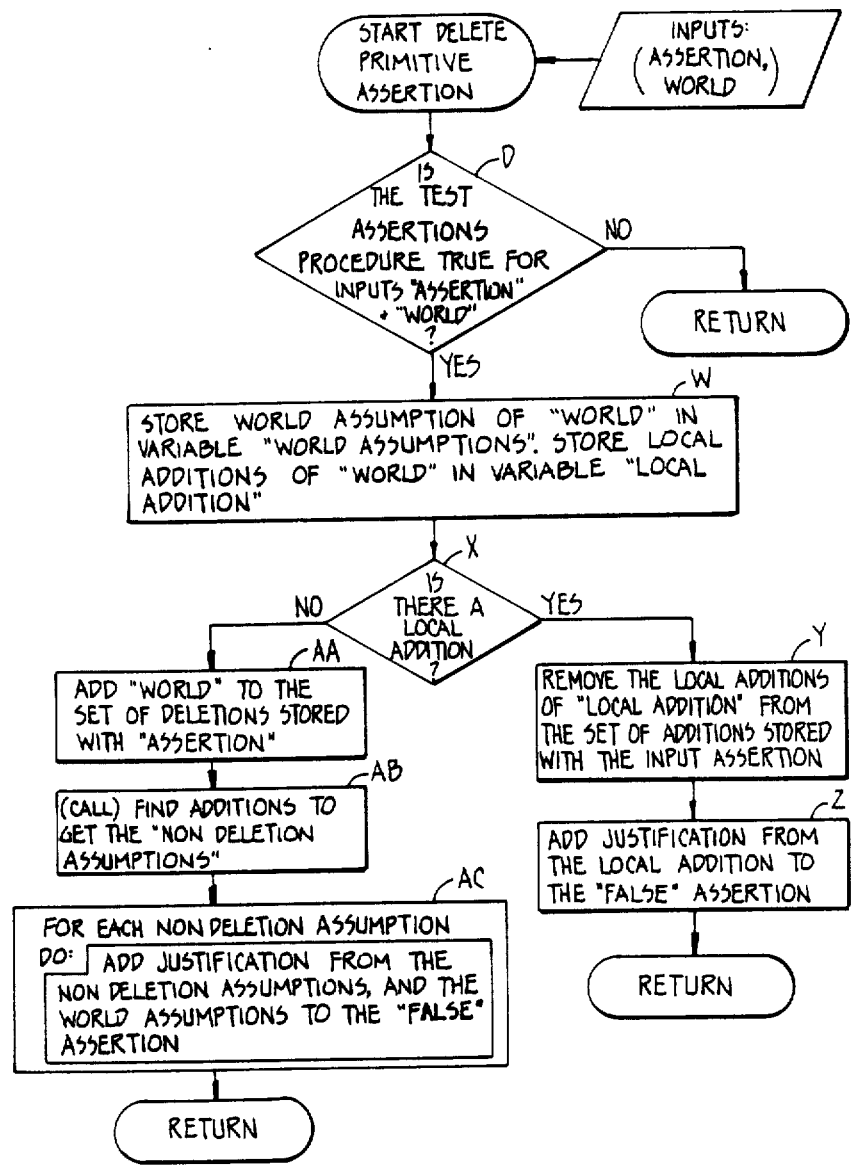
FIG._8.

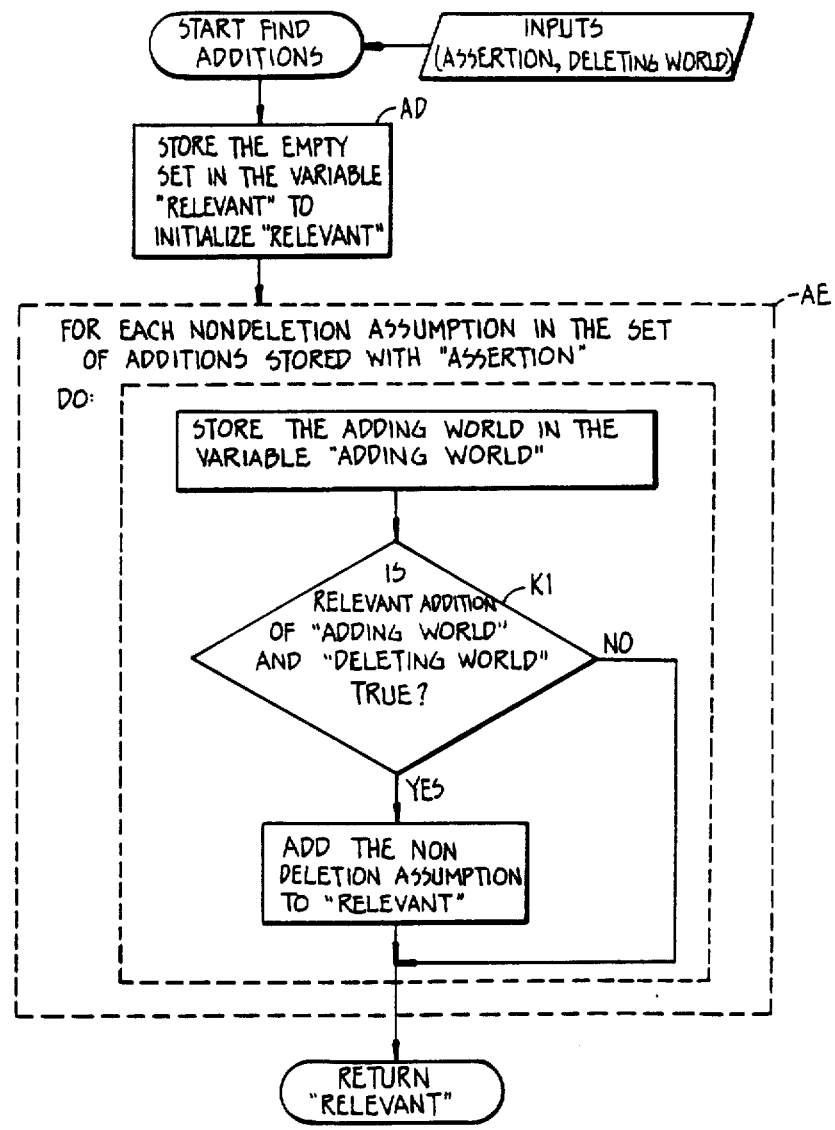
FIG._9.

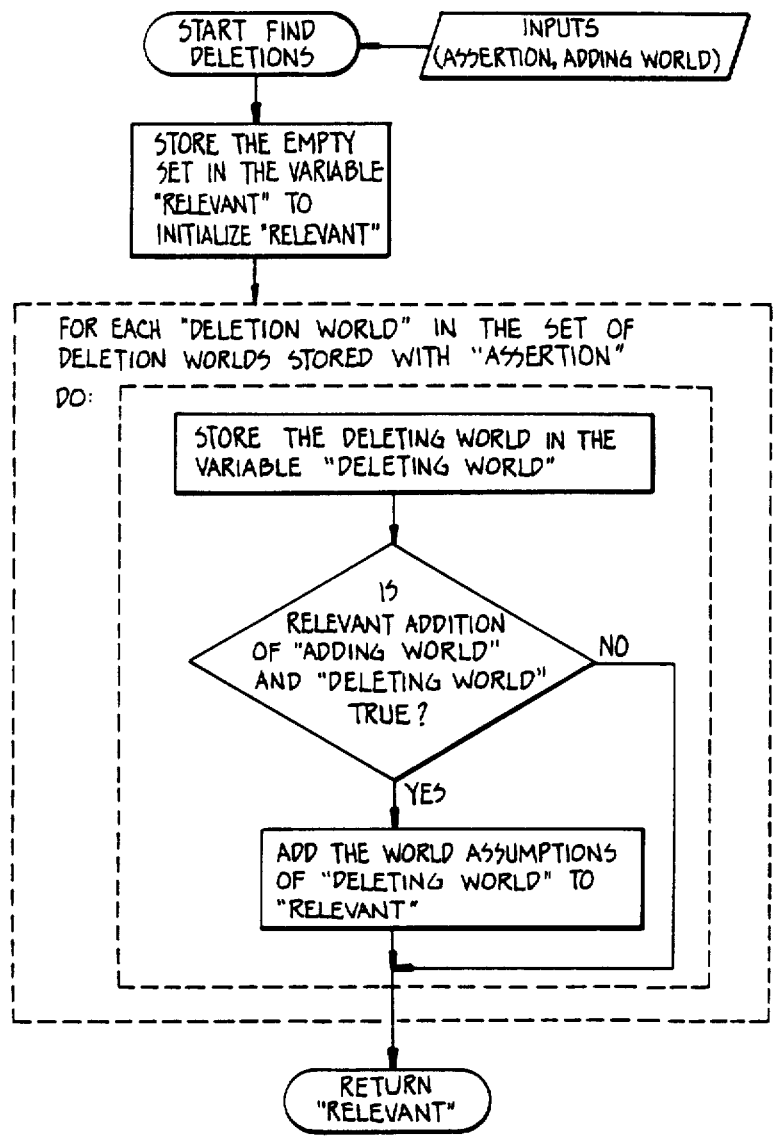
FIG._10.

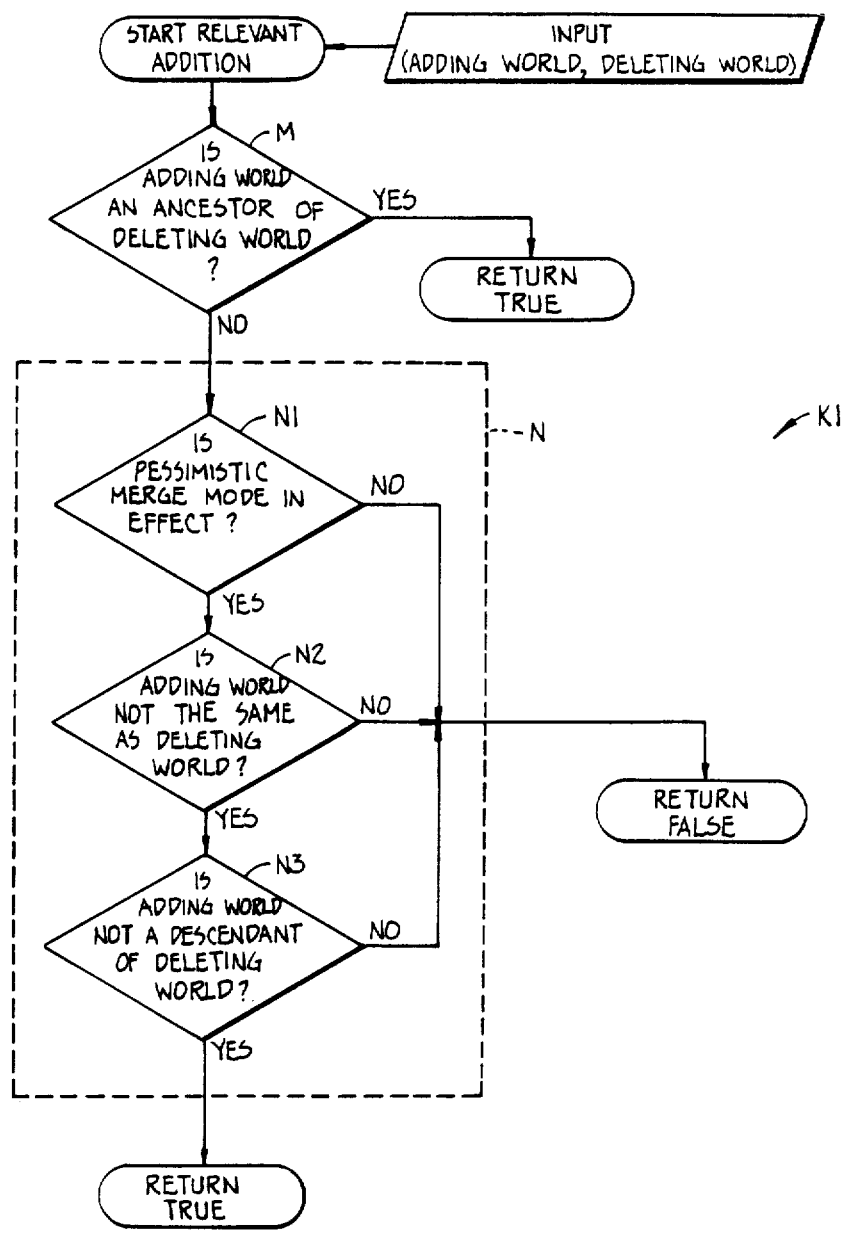
FIG._11.

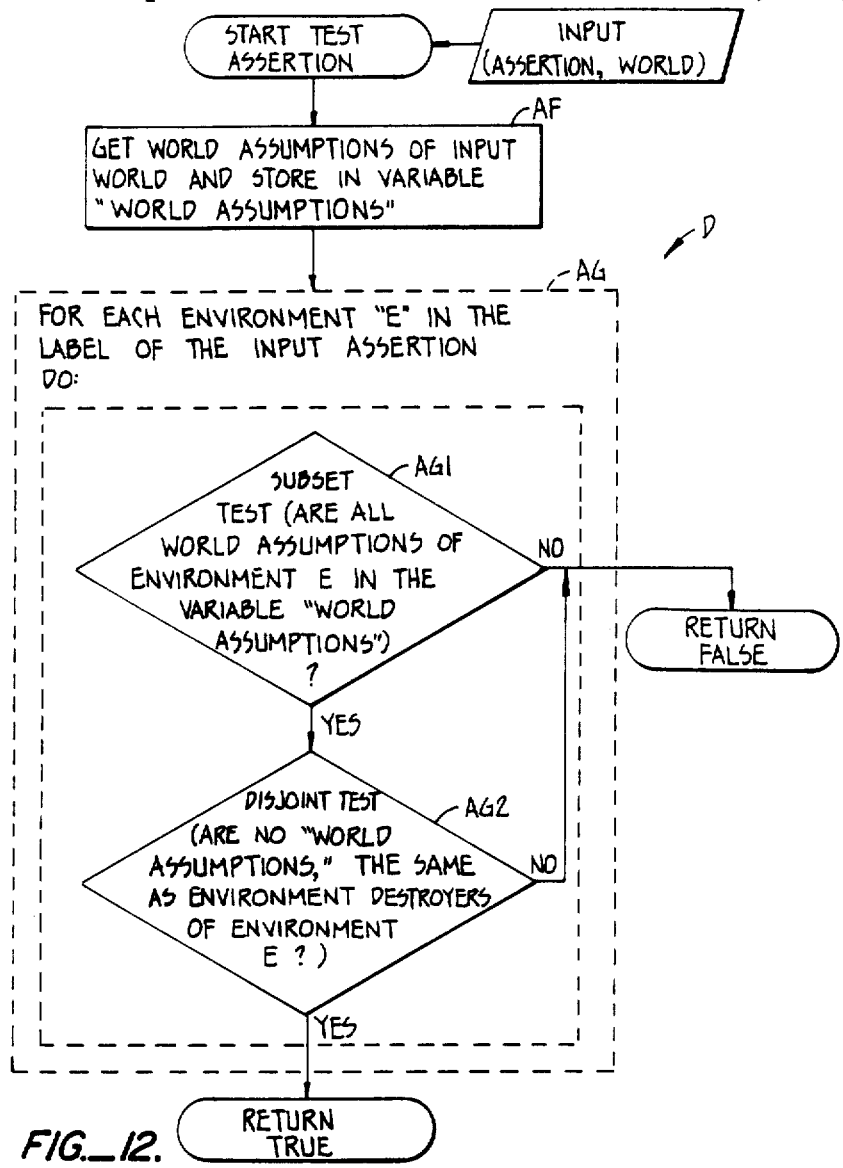
FIG._12.
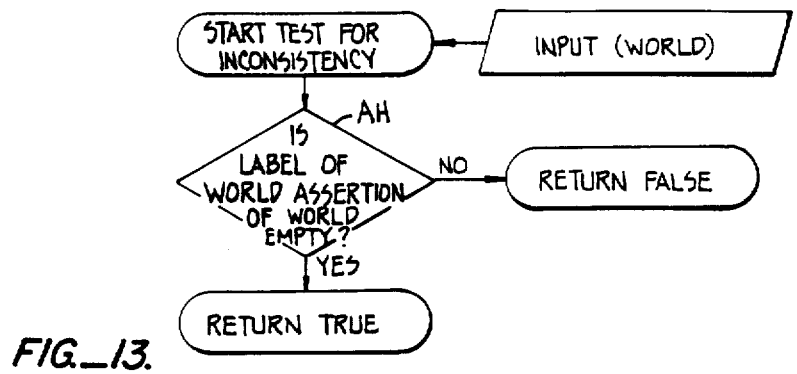
FIG._13.

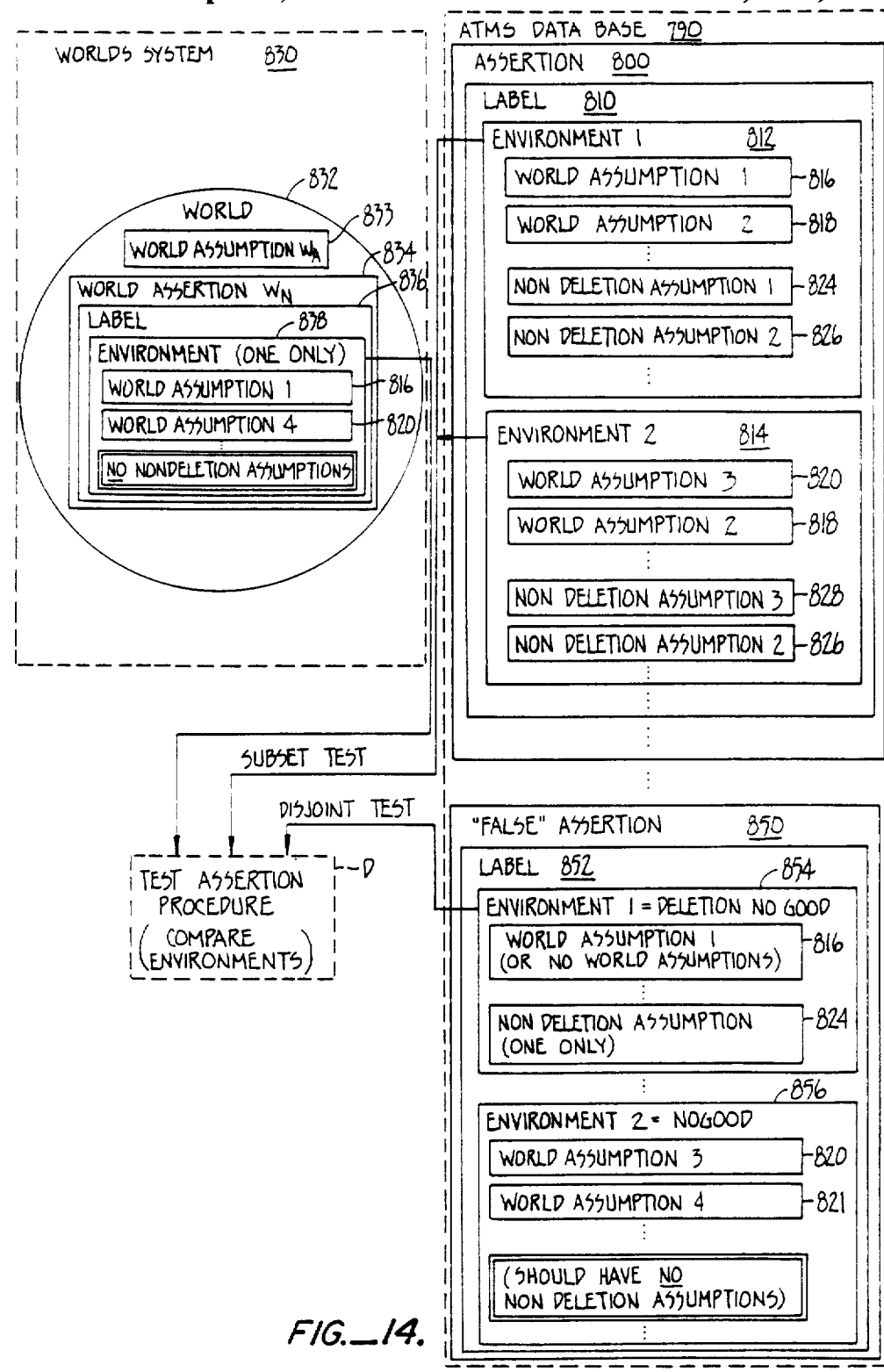
FIG._14.

METHOD FOR REPRESENTING A DIRECTED ACYCLIC GRAPH OF WORLDS USING AN ASSUMPTION-BASED TRUTH MAINTENANCE SYSTEM

ACKNOWLEDGEMENT OF SPONSORSHIP

This invention was made with government support under Air Force Contract No. F30602-85-C-0065 sponsored by the Air Force Systems Command, Rome Air Development Center, Griffiss Air Force Base, New York, and of the Defense Advanced Research Projects Agency, Arlington, Va. The Government has certain rights in this invention.

This is a continuation of Ser. No. 896,543 filed Aug. 13, 1986, now abandoned.

BACKGROUND OF THE INVENTION

This invention relates to artificial intelligence in which computers execute computer programs called knowledge-based systems, and more particularly it relates to assumption-based truth maintenance systems.

An assumption-based truth maintenance system (ATMS) is a tool for organizing a search through a "space" of alternatives. The assumption-based truth maintenance system (ATMS) was first introduced by Johan de Kleer. The de Kleer ATMS is described in a paper entitled "An Assumption-based Truth Maintenance System," which appeared in *Artificial Intelligence*, Vol. 28, pp. 127-162 (1986). This paper is incorporated herein by reference and made a part hereof. From the descriptions in this paper, one of ordinary skill in this art is able to construct a functional assumption-based truth maintenance system (ATMS) tool. An understanding of the basic concepts in this article is therefore necessary to appreciate the subject matter of the present invention.

In order to solve a problem in artificial intelligence, a knowledge-based system must often search through a space (or collection) of representations of alternative "states" of the problem environment. Herein a "state" is considered to be represented by a set of "assertions" which are held to be true at a particular time. An "assertion" is a data structure representing a statement or proposition in some knowledge-representation language about some aspect of the problem environment. An "assertion" does not carry a connotation of truth. That is, an "assertion" about a specified situation can either be believed or disbelieved by a given agent. It may be noted that some writers use the term "fact" or the term "node" in the sense the term "assertion" is used herein.

The selection of the set of "assertions" is based on their relevance to a particular problem. As an example, in planning a sequence of actions to achieve a goal, a planning system (which is a particular type of knowledge-based system) may search through a "space" of "states" that result from the performance of actions. On the other hand, a diagnosis system (which is another type of knowledge-based system) often searches through a "space" of alternative hypotheses about the "states" of a device that exhibits a certain behavior, e.g., faulty behavior.

Before proceeding further, reference is made to the *Handbook of Artificial Intelligence*, Volume I, edited by Avram Barr and Edward Feigenbaum (William A. Kaufmann, Inc., Los Altos, Calif., 1981). In particular, reference is made to pages 36 and 37 which describes the traditional notion of what is called a "context mechanism" in the prior literature. As used herein, a traditional "context mechanism" is termed a "world mechanism." Further, the term "world" as used herein is a synonymous term for the traditional term "context". The traditional notion of "context" should be distinguished from the use of the term "context" in the de Kleer paper. Reference is also made to the *Handbook of Artificial Intelligence* at pp. 72-76 in which is described the traditional notion of a "truth maintenance system."

It is possible to approach anew the representation and search of a "space" with each implementation of a knowledge-based system. However, it is often more convenient to provide tools and languages for constructing a knowledge-based system which permit the elimination of part of the work of designers or "knowledge engineers" by providing certain general-purpose facilities for representing and searching problem states.

Languages have been designed for use in artificial intelligence programming to render it more convenient to make the representations needed by knowledge-based systems. Two languages in particular, namely Conniver and QA4, introduced the concept of a (traditional) "context mechanism" for representing multiple "states" of a problem environment. Each "context" (world) consists of a set of "assertions" describing a state. The "context mechanisms" (world mechanisms) provided in Conniver and QA4 allow a tree of contexts to be "grown," in which each new "child" context starts out with the same assertions as its "parent," but then each "child context" may have assertions deleted and added in order to distinguish the "state" that it represents from that of its "parent". Such a tree of "contexts" (worlds) might be used, for example, to represent the intermediate "states" resulting from alternative sequences of actions. Each sequence of actions corresponds to a "path" in the tree.

Although the context mechanisms (traditional term) introduced by the languages Conniver and QA4 are quite useful for simple problems, there are several weaknesses. For example, no distinction is made in the set of assertions associated with a context (world) between those that are primitively specified and those that are derived by a deduction from primitive assertions and general knowledge of the problem domain. The user of the context mechanism must then explicitly specify not only the primitive deletions defining a new context but also deletions of derived assertions whose derivations are no longer valid in the new context. Furthermore, derivations of assertions performed in one context are not automatically transferred to non-descendant contexts in which they are also valid. Finally, the restriction to a tree-structured context graph may impose unnecessary sequential dependencies on choices in a search, which leads to inefficient chronological backtracking upon failure. (Chronological backtracking is mentioned and described in greater detail in *The Handbook and Artificial Intelligence*, Vol. I. In addition, the de Kleer article describes other selected problems with the chronological backtracking technique.)

Largely in response to the weaknesses of traditional context mechanisms described above, truth maintenance systems were developed. A truth maintenance system (TMS) is a tool or technique which can be used in a knowledge-based system to record derivation steps made by a problem solver as justifications linking assertions. A derivation is a set of problem solving steps each of which produces a conclusion from a given set of assertions. A TMS tool records a derivation step as a data structure called a "justification."

Traditional truth maintenance systems have several advantages. Because of the existence of justification records, derivation steps need not be repeated once they have been performed. Thus, a truth maintenance system is able to share partial results across different branches of a search space. Truth maintenance systems are also a useful and convenient tool for keeping track of contradictions among assertions which have been discovered by a problem solver, and thus they provide a basis for subsequently avoiding contradictions. Finally, justification records provide a basis for production of explanations of why assertions are to be believed.

Although truth maintenance systems provide a better means for recording dependencies among assertions than traditional context mechanisms, traditional truth maintenance systems are restricted to representing a single consistent problem state (i.e., context or world) at any single time. In addition, it is difficult to specify a transition to another context and inefficient to perform such a context switch. It is also difficult to explicitly compare distinct contexts.

The assumption-based truth maintenance system (ATMS), introduced by de Kleer, is a tool which is an advance over earlier truth maintenance systems in that the ATMS tool permits simultaneous reasoning about multiple, possibly conflicting contexts, avoiding the cost of context switching. The basic elements of the ATMS tool are "assumptions" and "assertions" (which de Kleer calls "nodes"). An assumption in the ATMS tool is an elementary stipulation which corresponds to a decision or choice. Assertions may be "justified" in terms of other assertions or in terms of assumptions. By tracing back through the justification structure, it is possible to determine the ultimate support for a derivation of an assertion as a set of assumptions. Such a set is called an "environment" for the assertion. Since an assertion may have multiple derivations, it may also have multiple environments. The set of (minimal) environments for an assertion is called its "label." Computing the labels of assertions is one to the major activities of the ATMS tool.

The basic inputs to the ATMS tool are new justifications. Such justifications cause the labels of affected assertions to be recomputed. Within the ATMS tool, there is a mechanism for denoting contradiction. This mechanism makes use of a "false" assertion. This "false" assertion is similar to a conventional assertion, may have justifications and may be associated with environments. The environments in the label of the false assertion are called "nogoods." Nogoods constitute minimal inconsistent environments. Environments which are discovered to be inconsistent, i.e., which are supersets of nogoods, are removed from the labels of assertions so that they are not used for further reasoning.

The ATMS tool, as described in the prior art, views problem solving as purely inferential. However, problems involving temporal changes or actions require some additional mechanism. Specifically, the ATMS tool does not provide the ability to delete an assertion in the transition from a parent context to a child context.

SUMMARY OF THE INVENTION

According to the invention, a method is provided for representing a directed acyclic graph of worlds using an assumption-based truth maintenance system (ATMS) as a tool. The invention introduces the concepts of a nondeletion assumption and a deletion nogood, in order to allow deletion of an assertion upon transition between worlds. The traditional (de Kleer) ATMS tool is augmented to allow distinction between two kinds of assumptions, namely the nondeletion assumption and the world assumption. The nondeletion assumption is the elementary stipulation indicating the presence of an added assertion in a world. The world assumption is the elementary stipulation representing existence of a world. According to the invention, a method for testing assertions is provided for determining whether an assertion holds in a world. The method involves taking into account the presence of deletion nogoods relevant to the tested assertion. A deletion nogood is a nogood which indicates the contradiction between a world assumption and a nondeletion assumption which arises from a deletion of an assertion. Deletion nogoods are introduced at a world to block any further inheritance of an assertion from an ancestor world. The ATMS tool is further modified by replacing the traditional ATMS notion of inconsistency with a concept of inconsistency wherein only world assumptions are blamed for inconsistencies. Such blame is laid on the world assumptions and not on the nondeletion assumptions by means of a feedback procedure involving nogoods other than deletion nogoods in accordance with the invention, whereby reduced nogoods (without nondeletion assumptions) are fed back to the ATMS. The method according to the invention provides numerous advantages to a worlds mechanism. There is an ability to represent merges of worlds (i.e., partial ordering of networks of actions or of world changes), an ability to detect inconsistent worlds, and an ability to maintain results derived from primitively-added assertions. The present invention may be used in connection with planning systems and diagnosis systems as well as with other types of knowledge-based systems.

The invention will be better understood by reference to the following detailed description taken in conjunction with the accompanying drawings.

BRIEF DESCRIPTION OF THE DRAWINGS

FIG. 1 is an illustration of a directed acyclic graph of worlds in a knowledge base constructed in accordance with the invention.

FIG. 2 is an illustration of a graph of assertions, assumptions and justifications.

FIG. 3 is an illustration of a directed acyclic graph of worlds in a knowledge base constructed in accordance with the invention for showing merge ambiguity.

FIG. 4 is a flow chart of a method for creating a world in accordance with the invention.

FIG. 5 is a flow chart of a method for adding a primitive assertion in accordance with the invention.

FIG. 6 is a flow chart of a method for justifying an assertion in accordance with the invention.

FIG. 7 is a flow chart of a method referred to herein as feedback and used in connection with the assertion justifying method in accordance with the invention.

FIG. 8 is a flow chart of a method for deleting a primitive assertion in accordance with the invention.

FIG. 9 is a flow chart of a method for finding additions (also known as nondeletion assumptions) in accordance with the invention.

FIG. 10 is a flow chart of a method for finding deletions in accordance with the invention.

FIG. 11 is a flow chart of a method for testing for relevant additions in accordance with the invention.

FIG. 12 is a flow chart of a method for testing for the presence of assertions in worlds in accordance with the invention.

FIG. 13 is a flow chart of a method for testing for inconsistency in worlds in accordance with the invention.

FIG. 14 is a diagram illustrating structures of a portion of a world and of a portion of an ATMS data base in accordance with the invention.

DESCRIPTION OF THE SPECIFIC EMBODIMENTS

Referring to FIG. 1, there is shown an example of the basic structure for modeling actions in a knowledge base according to the invention. The structure is a directed acyclic graph 10 of worlds W1 12, W2 14, W3 16, W4 18, W5 20 and W6 22. Each world 12, 14, 16, 18, 20, 22 may be regarded as representing an individual, fully specified action or state. A world, together with its ancestor worlds (e.g., world W2 14 with its parent world W1) represents a partially ordered network (e.g., network 24) of actions. Each descendant world (e.g., world W4 18) of a specified world (e.g., world W2 14) in the graph 10 then represents a hypothetical extension of the action network to include a subsequent action. The world graph 10 as a whole may thus be regarded as representing multiple, possibly conflicting action networks. In accordance with the invention, it is necessary that the effect of a fully specified action be represented by additions and deletions of assertions 26, 28, 30, 32. Thus each world has associated with it a set of additions and deletions which represent actual primitive changes determined by the action.

FIG. 1 illustrates an example worlds graph 10 from the subject area of blocks on a table. The assertions 26 of root world W1 12 represent: (1) block a is on block b, (2) block b is on the table, (3) block c is on block d, and (4) block d is on the table. The assertions (1), (2), (3) and (4) are added at root world W1 12 to represent the initial configuration of blocks and the table. The assertion changes 28 of descendant world W2 14 represent: delete assertion (1) or delete block a from on top of block b, and add a new assertion (5) or add block b onto the table. Thus, the deletion and the addition represent movement of block a from block b to the table. It is to be observed that each world may be associated with the state that results from applying the changes encoded by the subject world and all of its ancestors.

In the worlds system of FIG. 1, the world W5 20 has two parent worlds W3 16 and W6 22, each of which has assertions associated therewith. The resultant state of the world W5 20 is the accumulation of additions and deletions from its ancestor worlds.

The assertions in a world will in general be augmented with deductions using general knowledge in the knowledge base. Thus, those assertions which are true at a subject world fall into the following three categories:

1. Assertions inherited from ancestor worlds;
2. Assertions added at the world; and
3. Assertions deduced from assertions inherited or added at the subject world.

Additions and deletions are viewed as representing actual changes. Therefore, additions and deletions are recorded only where they are effective. For example, an addition is recorded in world where an assertion previously made does not hold. Thus, an assertion is inherited and considered to be true in descendant worlds, up to but not including the world wherein the assertion is deleted.

Deduced assertions may include the "false" assertion, that is, the special assertion which is a contradiction. The "false" assertion is illustrated hereinafter. A world in which the "false" assertion is deduced is marked as inconsistent to prevent its use in further reasoning processes requiring consistency.

The ATMS consists of two interrelated elements, the ATMS procedures, or ATMS tool, which perform the ATMS operations, and the ATMS data base. The ATMS procedures include the following:
 Create assertion,
 Create assumption,
 Add justification,
 Get assertion label,
 Get environment assumptions, The ATMS data base is a graph. The graph is characterized by
 assumptions,
 ATMS assertions,
 ATMS justifications and
 ATMS environments for forming labels.
 ATMS labels AI environments are ATMS environments, all assumptions are ATMS assumptions and all assertions are ATMS assertions. However, the environments, the assumptions and the assertions are of a particular form when they are associated with a world in a worlds system. Hence, an ATMS assertion of a form satisfying that required of a world may be referred to as a world assertion.

Referring now to FIG. 14, there is shown an illustration of several related structures. In particular, the structure of an ATMS assertion 800 in an ATMS data base 790 is shown, together with the structure of a world 832 in a world system 830. Each assertion 800 in an ATMS database 790 has a label 810. The label 810 consists only of environments, such as environment 812 and environment 814. A label may consist of a great many environments.

Each environment, for example environment 812, consists only of a set of world assumptions 816, 818 and nondeletion assumptions 824, 826. As a further example, environment 814 consists only of a set of world assumptions 820, 818 (as before) and nondeletion assumptions 828, 826 (as before). There may be many world assumptions and many nondeletion assumptions comprising each environment of the label of the (general) assertions in the ATMS data base, and the world assertions and nondeletion assertions may be shared among many environments.

Referring again to FIG. 14, each world 832 of a worlds system 830 has only one distinguished world assumption 833, called the world assumption 833 of the subject world 832. In addition, each world 832 has only one assertion 834, called the world assertion 834 of the subject world 832. As does any ATMS assertion, the world assertion 834 has a label 836, which in the case of a world 832 is called the world label 836 of the subject world 832. Unlike the label 810 of the general ATMS assertion 800, however, the world label 836 contains one and only one environment 838, called the world environment 838 of the subject world 832. Unlike the general ATMS environment 812, the world environment 838 consists of only one type of assumption, namely world assumptions 816, 820 (but not nondeletion assumptions). There may be zero, one or many world assumptions 816, 820 in the world environment 838. World assumptions in the world environment 838 in the world label 836 of the world assertion 834 are not to be confused with the prticular world assumption 833 of the subject world 832, which is the distinguished world assumption 833. It is helpful to keep a visualization of these concepts in mind throughout the description of the invention.

The world environment 838 corresponds to the state of the world. The world environment consists of the set of world assumptions from the subject world and all of the ancestor worlds of the subject world. It is therefore convenient to use the ATMS tool itself to compute the world environment. This is facilitated by providing world assertion 834. The world assertion 834, symbolically designated $N_W$ (often called the world node) is given a single justification:

$$N_{WP1}, N_{WP2}, \ldots, N_{WPN}, A_W \rightarrow N_W$$

where $N_{WP1}, N_{WP2}, \ldots, N_{WPN}$ are the world assertions of the parent worlds, and $A_W$ is the distinguished world assumption of the subject world.

In other words (referring to FIG. 2), for each subject world 22, a justification 420 is provided from:

(1) the assertion 220 of each of the parent worlds 20 (only one shown in FIG. 2); and (2) the distinguished world assumption 322 of the subject world; to:

(3) the world assertion 222 of the subject world 22.

Thus, each world assertion has only a single ATMS environment in its label, and the label is of the form described.

An ATMS assertion F may then be added at a subject world by supplying a justification in terms of the subject world assertion $N_W$. However, according to the invention, in order to allow for the possibility of a later deletion, it is necessary to include at the outset a "nondeletion assumption" NDA or $A_{W,F}$. Thus the resulting justification is:

$$N_W, A_{W,F} \rightarrow F$$

where $A_{W,F}$ is the nondeletion assumption.

A distinct nondeletion assumption is required for each separate addition of an assertion at a world in order to allow for independent deletion.

If the assertion F is deleted at a subsequent world (W1), then a new justification is supplied to the ATMS data base having the form:

$$A_{W1}, A_{W,F} \rightarrow FALSE$$

where $A_{W1}$ is the world assumption for world W1 and FALSE is a special form of assertion called the "false"-type assertion. The nogoods (as explained previously and again hereinbelow) resulting from justifications of this form are called "deletion nogoods." There is only one "false" assertion in the ATMS data base.

Referring again to FIG. 14, the structure of the single "false" assertion 850 in the ATMS data base 790 is depicted. The "false" assertion 850 has a label 852 which consists of a plurality of environments 854, 856 which have restricted characteristics as compared with the generalized ATMS assertion 800. The environments 854, 856 are called "nogoods". The nogoods are of two types, the standard nogood and the deletion nogood. The environment 856 is a standard nogood 856, simply called a nogood 856. A nogood 856 is characterized in that it contains only world assumptions, such as world assumptions 820, 821, and never contains nondeletion assumptions. If an attempt is made to place nondeletion assumptions in a nogood 856, the ATMS tool removes them. The environment 854 is an example of a deletion nogood 854. A deletion nogood 854 is characterized in that it contains only one nondeletion assumption 824 and in that it contains either zero, one or many world assumptions 816. The structure of the deletion nogoods allows certain tests to be performed which heretofore were not possible.

Justifications may be created automatically as above, or they may be entered by a user directly to a worlds system. User-added justifications represent deductions from assertions directly added at worlds, thus extending the set of the assertions associated with the worlds. Such deductions need only be performed once, since the presence of justifications in the ATMS data base allow the efficient determination of validity of assertions in each world, since labels are readily propagated by the ATMS tool.

Derivations of the "false" assertion arising from user-installed justifications determine inconsistent worlds, representing dead ends in the search. As noted hereinabove, the nogoods determined by the ATMS tool may however contain nondeletion assumptions in addition to world assumptions. Only world assumptions represent search choices and therefore are deemed responsible for dead ends in the reasoning process. The multiple worlds system constructed in accordance with the invention incorporates a feedback procedure which installs in the ATMS data base reduced nogoods having the nondeletion assumptions removed. The feedback procedure ensures that the deletion nogoods are the only nogoods containing nondeletion assumptions.

Referring again to FIG. 14, to test whether an assertion 800 holds in a world 834, each environment 812, 814 in the label 810 of the assertion 800 is compared with the world environment 830 of the subject world 832. The comparison is performed by means of the function "Test Assertion," an example of which is described hreinafter. (It is recognized that all assumptions are either world assumptions 816 or nondeletion assumptions 824.) More specifically, to test whether an assertion 800 holds in a world 832, a search is made of the environments 812, 814 in the label 810 of the assertion 800 to determine whether there is an environment 812, 814 which satisfies the following criteria:

(1) Each world assumption (816, 818) in the tested environment (812) of the subject assertion (800) is a member of the environment (838) of the subject world ((832) (the "subset" test); and (2) Each nondeletion assumption (824, 826) in the tested environment (812) of the assertion (800) is not in a deletion nogood (854) with any world assumption (816, 820) in the world environment (838) (the "disjoint" test).

If the search succeeds, then the assertion is regarded as true in the world. A simple example will aid in the understanding of the test assertion concept.

FIG. 2 illustrates a simple example of a graph of the invention explicitly showing world assumptions and world assertions in connection with the resultant assertions and the "false" assertion. Specifically, world W5 20 of FIG. 1 and world W6 22 of FIG. 1 are shown with the justifications relating to the two types of assumptions, namely, the nondeletion assumption 620 and the respective world assumptions 320 and 322. Within the world W6 20, there is a justification 420 from the world assumption 320 to the world assertion 220. Similarly, within world W6 22, there is a justification 422 from the world assumption 322 and the world assertion 220 to the world assertion 222. A justification 424 connects the world assertion 220 and the nondeletion assumption 620 to the assertion 30. Similarly, a justification 426 connects the world assumption 322 and the nondeletion assumption 620 to the "false" assertion 700.

The environment 520 for the world assertion 220 comprises the world assumption 320. The environment 522 for the world assertion 222 comprises the set of world assumption 320 and world assumption 322. The environment 530 for the assertion 30 is the set of world assumption 320 and nondeletion assumption 620. An environment 710 of the "false" assertion 700 is the set of the world assumption 322 and the nondeletion assumption 620. This "false" assertion environment 710 is called a deletion nogood.

To show that the assertion 30 is true for the world W5 20, evaluation is first carried out in world W5 20 using the test assertion procedure; and to show that the assertion is not true in world W6 22, evaluation is carried out in world W6 22 using the test assertion procedure. In this simple example, the assertion 30 has but a single environment 530 in its label (not shown), so only the single environment 530 needs to be tested. Applying the first criterion of the test above, it is apparent that the first criterion is satisfied in both cases for the single world assumption 320 of the assertion environment 530, since the world assumption 320 is a member of the world environment 520 of world W5 20 and since the world assumption 320 is a member of the world environment 522 of the world W6 22. However, the second criterion is satisfied only with respect to world W5 20, since the nondeletion assumption 620 in the assertion environment 530 is in the deletion nogood of "false" assertion environment 710 along with the world assumption 322, where the world assumption 322 is in the world environment 522 of world W6 22. It will be noted that the nondeletion assumption 620 is NOT in a deletion nogood with any world assumption in the world environment of world W5 20.

In more complex examples, a world may have multiple parents, as for example the world W4 18 and the world W6 22 in FIG. 1. A world having multiple parents is called a "merged" world, because it represents a "merge" of multiple parent worlds. The ability to perform merges allows a reasoning problem to be decomposed into nearly independent components, each of which can be analyzed separately and then later combined. A merge is defined as the union of all the changes represented by all of the ancestor worlds at the subject world. (This is not equivalent to performing a simple union of assertions in the parent worlds.)

In FIG. 1, the state of the world W4 18 is the accumulation of additions and deletions of assertions from all of its ancestor worlds W1 12, W2 14 and W3 16. Thus, the state of the world W4 18 is blocks a, b, c and d on the table.

Referring to FIG. 1, the assertion changes (additions and deletions) 28 along the branch including the world W2 14 are independent of the assertion changes (additions and deletions) 30 along the branch including the world W3 16 so far as the world W4 18 is concerned. However, in more general cases, a difficulty may arise wherever the effects of assertion changes depend upon the order in which changes are applied. Such a difficulty is known as an ambiguous merge.

FIG. 3 illustrates an example of an ambiguous merge. There are parallel branches between world W1 112 and world W5 120. In the left branch is world W2 114 which includes the assertion in the form of a change +P. In the right branch are the world W3 which includes the change +P and the world W4 118 which includes the change −P. The result at world W5 120 is ambiguous because it depends on the order of the preceding changes.

In order to remove the ambiguity, additional criteria must be adopted to define a merge. Two types of merges are therefore defined, the pessimistic merge and the optimistic merge. In the pessimistic merge, an individual assertion is considered to belong to the merge if it survives in every linearization of the actions. Thus, one may be assured that the assertion holds without respect to order. The absence of the assertion from the merge simply denotes ignorance, not falsity. In FIG. 3, the assertion P is absent from world W5 under a pessimistic merge.

In the optimistic merge, an assertion is considered true wherever an assertion is true in at least one linearization. In FIG. 3, the assertion P is present in world W5 under an optimistic merge.

Another way to view the difference between an optimistic merge and a pessimistic merge is by determination of whether an assertion added in an ancestor world inherits to the merged world. In an optimistic merge, the assertion is inherited unless there is some deletion of the assertion by an intermediate world. In the pessimistic merge, an assertion is inherited unless there is some deletion of the assertin by a world which is an ancestor of the merged world but not also an ancestor of the adding world. For example, in FIG. 3, in an optimistic merge, P would be true at world W5 120 because world W4 118 is not on a path between worlds W2 114 and W5 120. In a pessimistic merge, P would not be inherited from world W2 114 at world W5 120 even though world W4 118 is an ancestor of world W5 120 because world W4 118 is not also an ancestor of world W2 114.

The ATMS tool can be used to represent merges in a worlds system according to the invention. Whenever a subject world has multiple parents, the justification for the subject world assertion icludes each of its parent world assertions among its justifiers. The justification for additions and deletions proceeds as previously explained. However, the type of merge determines which justifications for "false" are entered and thus which additions are affected by which deletions. For a pessimistic merge, a deletion is effective with respect to all except descendant additions. For an optimistic merge, a deletion is effective with respect to ancestor additions only.

In many cases the children of a world are known a priori to represent mutually exclusive alternative extensions of the partial problem solution represented by the parent. In this situation, the system may render inconsistent any world formed as a merge of two or more of the children or of descendants of two or more of them. To this end, the concept of the "exclusion set" is introduced. Mutually exclusive worlds with a common parent are placed in exclusion sets with the effect that merges are marked as inconsistent. To do this, justifications for the "false" assertion are added wherein the justifiers are the pair-wise combinations of world assumptions from the worlds in the exclusion sets.

Reference is now made to specific procedures implemented in accordance with the invention. Referring to FIG. 4, there is shown a flow chart of the procedure according to the invention for creating a world in a worlds system. In the "Create World" procedure, the input parameter is the set of "parent worlds." The ATMS tool is called upon to create a new ATMS assumption (Step A) and to create a new ATMS assertion (Step A'). The ATMS tool is next called upon to add the justification from each of the assertions of the parent worlds and the newly created world assumption to the newly created assertion and to insert the newly created justification in the ATMSdata base (Step B). Finally the procedure creates a new "world structure" and inserts the new world assumption, the new world assertion and the set of parent worlds in the new "world structure" of the worlds system knowledge base (Step C). (It is to be understood that throughout this specification and the related literature, pointers are presumably used to give reference to lists and access to entities in a structure.)

Referring to FIG. 5, the "Add Primitive Assertion" feature is illustrated. With the inputs "world" and "assertion," the procedure starts by testing for truth of the input assertion (Step D), which if true, terminates the procedure. The "Test Assertion" procedure is explained elsewhere. If the "Test Assertion" procedure fails to determine that the assertion is true, then a new assumption is created (Step E) and the general "Justify Assertion" procedure is invoked (Step F), as explained hereinafter. The parameters passed are the world assertion and the nondeletion assumptions as justifiers and the input assertion as the justificand. The "Justify Assertion" procedure adds to the ATMS data base a justification from the nondeletion assumption and the world assertion to the added assertion. Then the nondeletion assumption is added to the set of additions stored with the input assertion (Step G). Next, the procedure "Find Deletions" is invoked using as inputs the subject assertion and the subject world (Step H). The "Find Deletions" procedure returns the set of world assumptions from the worlds corresponding to deletions of the subject assertion which have been made previously which could affect the current addition of the subject assertion. For each world assumption thus obtained, a justification is then added to the ATMS data base from that world assumption and from the nondeletion assumption to the "false" assertion (Step I). As a result the ATMS will produce deletion nogoods for each such prior deletion which affects this new addition.

Referring to FIG. 10, there is shown one embodiment of a "Find Deletions" procedure in accordance with the invention, which employs a loop. Alternative equivalent embodiments may use a "filter for . . . " construct or a "collect" construct. In FIG. 10, the "Find Deletions" procedure employs as input parameters the "assertion" and the "adding world," namely, the input world of the calling procedure "Add Primitive Assertion." The value "relevant" is initialized with an empty set (a list containing no elements) (Step J). A loop is invoked to determine, for each "deleting world" (a variable) in the set of "deleting worlds" which is stored with the subject assertion, those "deleting worlds" for which the operation "relevant addition" is true for the subject "adding world" (Step K). The world assumptions associated with the subset thus collected are then added to the value "relevant" so that the relevant list can be returned (Step L).

Referring to FIG. 11, the relevant addition procedure of Step K is illustrated. The relevant addition procedure determines whether the addition of the "assertion" at the subject "adding world" s relevant with respect to a "deleting world."

Using the input "adding world" and "deleting world," the procedure test whether the "adding world" is an ancestor of the "deleting world" (Step M). If it is, then the value true is returned, indicating that the addition is relevant. If it is not an ancestor, then three further tests are performed (in any sequence), each of which must be passed in order to confirm that the addition is relevant (Step N). The first test is whether the pessimistic merge mode is in effect (Step N1). If not, then the optimistic merge mode must necessarily be in effect, and the "addition" is considered not relevant ( a value "false" is returned). The second test is whether the "adding world" is different from the "deleting world" (Step N2). If not, then the "addition" is considered not relevant. The remaining test is whether the "adding world" is not a descendant of the "deleting world" (Step N3). If not, then the addition is considered "not relevant." If the tests are all passed, however, the value returned is "true," indicating that the "addition" is considered relevant.

Referring to FIG. 6, the "Justify Assertion" procedure (Step F) is illustrated. It starts with the step of calling upon the ATMS tool to add to the ATMS data base a justification based on the inputs (Step P). The inputs are the justifiers and the assertion which is to be justified (the justificand). In the particular instance of the "Add Primitive Assertion" procedure of FIG. 5, thhe justification is from the nondeletion assumption and the world assertion to the added assertion (Step P). The next step is to receive the new nogood list from the ATMS tool (Step Q) so that the nogood list can be analyzed. The next step is to invoke the "Feedback" procedure for each nogood in the returned list (Step R).

Referring to FIG. 7, the "Feedback" procedure is illustrated. The first step is to get the environment assumptions defining the subject nogood (Step S). The next step is to filter for (or its equivalent) world assumptions. That is, a new set of assumptions is created which contains only the world assumptions from the input nogood environment. This means that the set does not contain the nondeletion assumptions from the input nogood environment (Step T). Next, a justification is added to the ATMS data base from the world assumptions thus obtained to the "false" assertion (Step U). This causes the ATMS tool to replace the original nogood with a new, smaller nogood without the nondeletion assumptions.

Referring to FIG. 8, the "Delete Primitive Assertion" procedure to delete a primitive assertion is illustrated. First, the input denoted "assertion" is tested with the "Test Assertion" procedure to determine if it is true in the subject input "world" (Step D). If so, the world assumptions of the subject world are stored in a variable value "world assumption" and the local additions, if any, of the subject input "world" are stored in the variable value "local addition" (Step W). Then a test is performed to determine if in fact there was a local addition (Step X). If the test indicates yes, the the value of the local addition (which is a nondeletion assumption) is removed from the set of additions stored with the subject assertion (Step Y) and the ATMS is used to add a justification from the local addition thus removed to the "false" assertion (Step Z).

If the above test indicated false (i.e., no local additions or nondeletion assumption)), then the subject world is added to the set of deletions stored with the subject assertion (Step AA). Thereafter, a "Find Additions" procedure is called upon to get the nondeletion assumptions (Step AB). Then, for each nondeletion assumption thus obtained, a justification is added to the ATMS data base (1) to the "false" assertion from (2) the nondeletion assumption and (3) the world assumption (Step AC).

Referring to FIG. 9, one embodiment of the "Find Additions" procedure is illustrated. This procedure finds nondeletion assumptions corresponding to relevant additions of the assertion. The relevant additions are those additions which relate to the deletion which has been performed. Using as inputs the assertion and the world, the first step is to set a variable "relevant" to an initialized or empty set (Step AD). Then a loop (Step AE) is performed for each nondeletion assumption in the set of additions stored with the subject assertion to find all the worlds where the subject assertion is added involving the relevant addition test (Step K1), which is performed to find the relevant nondeletion assumptions (Step AE). The set of relevant nondeletion assumptions is stored in the value "relevant" and returned.

Referring to FIG. 12, the "Test Assertion" procedure (Step D above) is illustrated. Using as inputs the "assertion" and the "world," the world assumptions associated with the subject world are stored in a variable called "world assumptions" (Step AF). Then for each value of another variable "e," which is set in turn to each of the environments in the label of the subject assertion, two tests are performed, "subset" and "disjoint" (Step AG).

The "subset" test (Step AG1) yields a "true" value if all world assumptions of the variable "e" are in the variable "world assumptions." The "disjoint" test (Step AG2) yields a "true" value if the set "world" of "world assumptions" has no elements in common with a set known as "environment destroyers" of the subject environment. The environment destoryers set is the set of destroying assumptions for the environment. This set is obtained from the ATMS tool. The data structure for such a set contains the set of every assumption that is inconsistent with the subject environment due to presence of such an assumption in a two-element nogood with an assumption in the subject environment. If both of the above tests yield a true value, then the "Test Assertion" procedure returns the value "true." Otherwise, it returns the value "false."

Referring now to FIG. 13, a "Test for Inconsistency" procedure according to the invention is illustrated. This test is to determine whether a world (the input) is identifiable as internally inconsistent. This condition will be evident from an examination of the label of the world assertion of the subject input world. The test works because the "Feedback" procedure causes inconsistent worlds to have inconsistent environments and because the ATMS tool removes inconsistent environments from labels. Accordingly, the inconsistency test is to check if the label of world assertion of the subject input world is empty (Step AH). If empty, then the subject input world is internally inconsistent and the value returned is the value "true." If the label is not empty, the subject input world is judged to be consistent, and the value returned is the value "false."

As further detailed explanation of the methods according to the invention, there is attached hereto as Appendix A a mixed LISP language source code listing and narrative description of the procedures of the worlds mechanism in accordance with the invention. Also attached hereto in Appendix B is a description of the ATMS procedures employed by the worlds mechanism and of one suitable ATMS tool.

The invention has now been explained in reference to specific embodiments. Further embodiments will be apparent to those of ordinary skill in this art. It is therefore not intended that this invention be limited except as indicated by the appended claims.

APPENDIX A

PROCEDURES OF THE WORLDS MECHANISM

CREATE.WORLD (parent.worlds)

; Creates a new world in the worlds graph.

```
LET world.assumption = CREATE.ASSUMPTION("world");
LET world.assertion = CREATE.ASSERTION;
LET parent.assertions = FOR parent IN parent.worlds
                COLLECT GET.WORLD.ASSERTION(parent);
ADD.JUSTIFICATION(world.assertion,
                ~CONS(world.assumption, parent.assertions));
LET world be a new world data structure
    with parent.worlds as parents;
Store world.assumption and world.assertion in world;
RETURN world
END
```

ADD.PRIMITIVE.ASSERTION (assertion, world)

; Adds an assertion to a world as a primitive.

```
IF TEST.ASSERTION(assertion, world) = FALSE
THEN LET nondeletion.assumption = CREATE.ASSUMPTION("nondel");
     Store assertion and world in nondeletion.assumption;
     LET world.assertion = GET.WORLD.ASSERTION(world);
     JUSTIFY.ASSERTION(assertion,
                 LIST(world.assertion, nondeletion.assumption));
     Add nondeletion.assumption to the set of additions
        stored with assertion;
     FOR EACH world.assumption
      IN FIND.DELETIONS(assertion, world)
      DO ADD.JUSTIFICATION(FALSE-assertion,
                          LIST(nondeletion.assumption,
                                world.assumption))
END FIND.DELETIONS (assertion, adding.world)

; Returns a set of world assumptions corresponding
; to those deletions of assertion that are relevant to
; adding.world LET relevant = EMPTY.SET;
FOR EACH deleting.world
   IN the set of deleting worlds stored with assertion
   DO IF RELEVANT.ADDITION(adding.world, deleting.world)
      THEN Add GET.WORLD.ASSUMPTION(deleting.world) to relevant;
RETURN relevant
END RELEVANT.ADDITION (adding.world, deleting.world)

;determines whether an addition of an assertion at
;adding.world is a relevant addition with respect to
;deleting.world.

IF adding.world is an ancestor of deleting.world
    or pessimistic.merge.flag
        and adding.world is not deleting.world
        and adding.world is not a descendant of deleting.world
THEN RETURN TRUE
ELSE RETURN FALSE
END JUSTIFY.ASSERTION (assertion, justifiers)

; Adds a user-level justification for an assertion.

LET new.nogoods = ADD.JUSTIFICATION(assertion, justifiers);
FOR EACH nogood IN new.nogoods
   DO FEEDBACK(nogood)
END FEEDBACK (nogood)

; To ensure that nondeletion assumptions are not implicated
  in search failures.

LET world.assumptions =
    FILTER.FOR.WORLD.ASSUMPTIONS(GET.ENVIRONMENT.ASSUMPTIONS(nogood))
```

ADD.JUSTIFICATION(FALSE-assertion, world.assumptions)
END

FILTER.FOR.WORLD.ASSUMPTIONS (assumption.set)

; Returns the set of those assumptions in an assumption
; set that are world assumptions.

FOR assumption in assumption.set
WHEN GET.ASSUMPTION.EXTERNAL(assumption) = "world"
COLLECT assumption
END DELETE.PRIMITIVE.ASSERTION (assertion, world)

; Removes an assertion as a primitive from a world.

IF TEST.ASSERTION(assertion, world) = TRUE
THEN LET world.assumption = GET.WORLD.ASSUMPTION(world);
     LET local.addition = FIND.LOCAL.ADDITION(assertion,world);
     IF local.addition
     THEN Remove local.addition from the set of additions
              stored with assertion;
          ADD.JUSTIFICATION(FALSE-assertion, LIST(local.addition))
     ELSE Add world to the set of deletions stored
              with assertion;
          FOR EACH nondeletion.assumption
           IN FIND.ADDITIONS(assertion, world)
           DO ADD.JUSTIFICATION(FALSE-assertion,
                              LIST(nondeletion.assumption,
                                   world.assumption))
END FIND.ADDITIONS (assertion, deleting.world)

; Returns a set of nondeletion assumptions corresponding
; to those additions of assertion at other worlds that are
; relevant to deleting.world LET relevant = EMPTY.SET;
FOR EACH nondeletion.assumption
  IN the set of additions stored with assertion
  DO LET adding.world be
         the world stored with nondeletion.assumption;
     IF RELEVANT.ADDITION(adding.world, deleting.world)
     THEN Add nondeletion.assumption to relevant;
RETURN relevant
END TEST.ASSERTION (assertion, world)

; Tests whether an assertion is true in a consistent world.

LET world.environment be the first environment in the label of
    the world assertion of the world;
LET world.assumptions =
            GET.ENVIRONMENT.ASSUMPTIONS(world.environment);
IF FIND environment e in GET.ASSERTION.LABEL(assertion)
   SUCH THAT
     DISJOINT(world.assumptions, GET.ENVIRONMENT.DESTROYERS(e))
   AND
     SUBSET(

```
      FILTER.FOR.WORLD.ASSUMPTIONS(GET.ENVIRONENT.ASSUMPTIONS(e)),
      world.assumptions)
   THEN RETURN TRUE
   ELSE RETURN FALSE
END INCONSISTENT? (world)

; Tests whether a world is known to be inconsistent
; due to its associated set of assertions containing
; the special FALSE assertion.

IF GET.ASSERTION.LABEL(GET.WORLD.ASSERTION(world)
   contains no environments
THEN TRUE
ELSE FALSE
END
```

APPENDIX B

ATMS PROCEDURES EMPLOYED BY THE WORLDS MECHANISM

CREATE.ASSERTION

This returns a new ATMS assertion.

CREATE.ASSUMPTION (external)

Returns a new ATMS assumption. The external argument is an external datum that is stored in the assumption data structure.

GET.ASSUMPTION.EXTERNAL (assumption)

Returns the external datum stored in the assumption data structure

ADD.JUSTIFICATION (justificand, justifiers)

This is the central procedure of the ATMS. It installs a new justification and causes affected labels to be updated. This includes adding new supporting environments to the labels, while removing newly discovered nogood environments. The justifiers argument is a list of ATMS assertions or assumptions. The justificand argument is generally an assertion. It may also be the FALSE (pseudo-)assertion, indicating a contradiction. Returns a list of newly discovered nogood environments.

GET.ASSERTION.LABEL (assertion)

Returns the set of environments in the label of an ATMS assertion.

GET.ENVIRONMENT.ASSUMPTIONS (environment)

Returns the set of assumptions in the environment

GET.ENVIRONMENT.DESTROYERS (environment)

Returns the set of "destroying" assumptions for the environment. A destroying assumption is one that is inconsistent with the environment due to the assumption forming a nogood with some assumption in the environment. The set of destroying assumptions is stored in the data structure for an environment.

```
(PRETTYCOMPRINT ATMSCOMS)

(RPAQQ ATMSCOMS ((RECORDS ASSUMPTION ATMS BITVECTOR ENVIRONMENT EXCLUDER JUSTIFICATION NODE)
     (FNS ADD.ENVIRONMENTS DOUBLETON.NOGOOD ADD.JUSTIFICATION COMBINE.LABELS CONTRA.UPDATE
        DADD.VECTOR DISJOINT.VECTOR DREM.VECTOR ENV.ASSUMPTIONP ENV.INTERN ENV.SUBSET
```

```
                EQVECTOR CREATE.ASSUMPTION CREATE.EXCLUDER CREATE.NODE ENV.MERGE ENV.MERGEALL
                EXCLUDED EXTRACT.ANTECEDENTS EXTRACT.INFORMANT EXTRACT.NODE FIRST.BIT
                GET.BITVECTOR.ENVIRONMENT GET.CONSEQUENCES GET.ENV GET.ENVIRONMENT GET.INDICES
                GET.JUSTIFICATIONS GET.NOGOODS MAKE.ANNIHILATOR LOOK MAKE.BITVECTOR MAKE.BV
                MAKE.COMBINE.BITVECTOR MAXBITPOS MERGE.ASSUMPTIONS Q8 Q8.PARE Q8.RESET Q8.SOLS
                SIMPLIFY.ENVLST SINGLETON.NOGOOD SPECIAL.ENVCHECK SUBSUMED SUBSUMPTION.DAEMON
                SUBVECTOR TEST.BITVECTOR TEST.NOTION UNINDEX.JUSTIFICATION UPDATE.LABELS
                \EXTRACT.ANTECEDENTS \GET.ATMS.LABEL \GET.JUSTIFICATIONS)
        (CONSTANTS (BITVECTOR.CHUNKSIZE (INTEGERLENGTH MAX.SMALLP)))
        (MACROS FIRST.BIT)))
[DECLARE: EVAL@COMPILE (DATATYPE ASSUMPTION (INDEX EXCLUDERS EXTERNAL DEPENDENTS CANCELFLG MAXENVSIZE NOGOODLST
                    DESTROYERS))

(RECORD ATMS (GOOD.ENVLST ENVHASH NOGOODS NOGOODS2 NOGOODS1 COUNT EXCLUDERCOUNT
                    NOT.SO.BAD.DEMONS ASSHASH)
        COUNT ← 0 EXCLUDERCOUNT ← 0 ENVHASH ← (HASHARRAY 1000)
        ASSHASH ← (HASHARRAY 200))

(RECORD BITVECTOR (FULLCHUNKS CHUNKLST))

(DATATYPE ENVIRONMENT (IN.NODES ASSUMPTIONS ENVCOUNT BITVECTOR ANNIHILATOR CONTRADICTORY))

(DATATYPE EXCLUDER (EXCLUDERELEMENTS EXCLUDERNAME EXCLUDERINDEX EXCLUDERANCHOR))

(DATATYPE JUSTIFICATION (INFORMANT JUSTIFIERS JUSTIFICAND))

(DATATYPE NODE (DATUM ATMSLABEL JUSTIFICATIONS CONSEQUENCES FALSE ASSERTIONPROPS))
]
(/DECLAREDATATYPE (QUOTE ASSUMPTION)
                  (QUOTE (POINTER POINTER POINTER POINTER POINTER POINTER POINTER POINTER))
                  (QUOTE ((ASSUMPTION 0 POINTER)
                          (ASSUMPTION 2 POINTER)
                          (ASSUMPTION 4 POINTER)
                          (ASSUMPTION 6 POINTER)
                          (ASSUMPTION 8 POINTER)
                          (ASSUMPTION 10 POINTER)
                          (ASSUMPTION 12 POINTER)
                          (ASSUMPTION 14 POINTER)))
                  (QUOTE 16))
(/DECLAREDATATYPE (QUOTE ENVIRONMENT)
                  (QUOTE (POINTER POINTER POINTER POINTER POINTER POINTER))
                  (QUOTE ((ENVIRONMENT 0 POINTER)
                          (ENVIRONMENT 2 POINTER)
                          (ENVIRONMENT 4 POINTER)
                          (ENVIRONMENT 6 POINTER)
                          (ENVIRONMENT 8 POINTER)
                          (ENVIRONMENT 10 POINTER)))
                  (QUOTE 12))
(/DECLAREDATATYPE (QUOTE EXCLUDER)
                  (QUOTE (POINTER POINTER POINTER POINTER))
                  (QUOTE ((EXCLUDER 0 POINTER)
                          (EXCLUDER 2 POINTER)
                          (EXCLUDER 4 POINTER)
                          (EXCLUDER 6 POINTER)))
                  (QUOTE 8))
(/DECLAREDATATYPE (QUOTE JUSTIFICATION)
                  (QUOTE (POINTER POINTER POINTER))
                  (QUOTE ((JUSTIFICATION 0 POINTER)
                          (JUSTIFICATION 2 POINTER)
                          (JUSTIFICATION 4 POINTER)))
                  (QUOTE 6))
(/DECLAREDATATYPE (QUOTE NODE)
                  (QUOTE (POINTER POINTER POINTER POINTER POINTER POINTER))
                  (QUOTE ((NODE 0 POINTER)
                          (NODE 2 POINTER)
                          (NODE 4 POINTER)
                          (NODE 6 POINTER)
                          (NODE 8 POINTER)
                          (NODE 10 POINTER)))
                  (QUOTE 12))
(DEFINEQ (ADD.ENVIRONMENTS
  [LAMBDA (LABEL NEW.ENVIRONMENTS DERIVED.NODE ATMS)         (* Morris "10-Oct-85 13:59")
```

(* This returns a list which combines the new environments with the old
environments in LABEL. Note that it drops any environments in LABEL which are
subsumed by those in NEW.ENVIRONMENTS.)

```
(for L on LABEL bind E SUBSUMEDFLG
    do (SETQ E (CAR L))
       (COND
         ((SUBSUMED E NEW.ENVIRONMENTS)
          (SETQ SUBSUMEDFLG T)
          (RPLACA L (QUOTE *DELETED*))
          (SUBSUMPTION.DAEMON E DERIVED.NODE)))
    finally (RETURN (COND
                      [(EQ DERIVED.NODE (QUOTE FALSE))
                       (NCONC (for ENV in NEW.ENVIRONMENTS collect ENV
                                   unless (OR (SINGLETON.NOGOOD ENV ATMS)
                                              (DOUBLETON.NOGOOD ENV ATMS)))
                              (COND
                                (SUBSUMEDFLG (DREMOVE (QUOTE *DELETED*)
                                                      LABEL))
                                (T LABEL]
                      (T (APPEND NEW.ENVIRONMENTS (COND
                                                    (SUBSUMEDFLG (DREMOVE (QUOTE *DELETED*)
                                                                          LABEL))
                                                    (T LABEL])
```

(DOUBLETON.NOGOOD
  [LAMBDA (ENV ATMS)                                    (* Morris " 9-Oct-85 16:28")

(* * This is a predicate, used for checking new nogoods, that returns true if ENV is a doubleton
    environment, i.e. contains two assumptions. In that case it updates the annihilators of affected
    environments, and notes the doubleton in the NOGOODS2 list.)

```
(PROG ((ASSUMPTIONS (fetch (ENVIRONMENT ASSUMPTIONS) of ENV))
       BITPOS1 BITPOS2)
      (COND
        ((EQLENGTH ASSUMPTIONS 2)
         (SETQ BITPOS1 (SUB1 (CAR ASSUMPTIONS)))
         (SETQ BITPOS2 (SUB1 (CADR ASSUMPTIONS)))
         [for ENV in (fetch GOOD.ENVLST of ATMS) do (COND
                                                     ((TEST.BITVECTOR (fetch (ENVIRONMENT
                                                                                BITVECTOR)
                                                                             of ENV)
                                                                      BITPOS1)
                                                      (DADD.VECTOR (fetch (ENVIRONMENT
                                                                             ANNIHILATOR)
                                                                          of ENV)
                                                                   BITPOS2))
                                                     ((TEST.BITVECTOR (fetch (ENVIRONMENT
                                                                                BITVECTOR)
                                                                             of ENV)
                                                                      BITPOS2)
                                                      (DADD.VECTOR (fetch (ENVIRONMENT
                                                                             ANNIHILATOR)
                                                                          of ENV)
                                                                   BITPOS1]
         (push (fetch (ATMS NOGOODS2) of ATMS)
               ENV)
         (RETURN T])
```

(ADD.JUSTIFICATION
  [LAMBDA (JUSTIFIER.LIST JUSTIFICAND INFORMANT GOOD.DAEMON)
                                                        (* PHM "31-May-85 15:34")

(* This is the central procedure of the ATMS. It adds a new derivation to the
    database. A justifier may be an assumption or a node. The justificand is a node or
    the identifier FALSE. Label updatings are propagated upwards in the ATMS.
    If any new nogoods are discovered, affected labels are also updated.
    Returns a list of new nogoods.)

```
(PROG ((JUSTIFICATION (create JUSTIFICATION
                              JUSTIFIERS ← JUSTIFIER.LIST
                              JUSTIFICAND ← JUSTIFICAND
                              INFORMANT ← INFORMANT))
```

```
                    NEW.NOGOODS)
                (DECLARE (SPECVARS NEW.NOGOODS))
                (for J in JUSTIFIER.LIST when (NOT (OR (type? NODE J)
                                                      (type? ASSUMPTION J)))
                   do (ERROR "JUSTIFIERS must be nodes or assumptions" J))
                (if [NOT (OR (type? NODE JUSTIFICAND)
                             (EQ JUSTIFICAND (QUOTE FALSE]

then (ERROR "JUSTIFICAND must be node" JUSTIFICAND))
                                                                  (* Input checking)
                [for J in JUSTIFIER.LIST do (COND
                                             ((type? NODE J)
                                               (push (fetch (NODE CONSEQUENCES) of J)
                                                     JUSTIFICATION))
                                             ((AND (type? ASSUMPTION J)
                                                   (NEQ JUSTIFICAND (QUOTE FALSE)))
                                                (push (fetch (ASSUMPTION DEPENDENTS) of J)
                                                      JUSTIFICATION]

(COND
                  ((NEQ JUSTIFICAND (QUOTE FALSE))
                    (push (fetch JUSTIFICATIONS of JUSTIFICAND)
                          JUSTIFICATION)))
                (UPDATE.LABELS JUSTIFICATION ATMS GOOD.DAEMON)    (* UPDATE.LABELS calls itself recursi
vely
                                                                     putting any nogoods it finds on
                                                                     NEW.NOGOODS)

(RETURN NEW.NOGOODS])

(COMBINE.LABELS
  [LAMBDA (JUSTIFIERS OLDLABEL ATMS DERIVED.NODE)       (* Morris "17-Feb-86 16:29")

(* This takes the labels of the justifiers and combines them to form environments.
    The resulting environment list is simplified to eliminate redundancies and contradictory
    environments, and note surviving new environments on the ATMS GOOD.ENVLST)

(SIMPLIFY.ENVLST OLDLABEL DERIVED.NODE ATMS
                    (COND
                      [(NULL JUSTIFIERS)
                        (LIST (create ENVIRONMENT
                                      BITVECTOR ← (create BITVECTOR
                                                          FULLCHUNKS ← 0
                                                          CHUNKLST ← (LIST 0]
                      ((AND (NULL (CDR JUSTIFIERS))
                            (type? NODE (CAR JUSTIFIERS)))
                        (fetch (NODE ATMSLABEL) of (CAR JUSTIFIERS)))
                      (T (for J in (COND
                                     ((type? NODE (CAR JUSTIFIERS))
                                       (CDR JUSTIFIERS))
                                     (T JUSTIFIERS))
                            bind [ENVIRONMENTS ← (COND
                                                   ((type? NODE (CAR JUSTIFIERS))
                                                     (fetch (NODE ATMSLABEL)
                                                        of (CAR JUSTIFIERS)))
                                                   (T (LIST (create ENVIRONMENT]
                                 (SCRATCH ← (CONSTANT (CONS)))
                            do [for ENV in ENVIRONMENTS first (SETQ ENVIRONMENTS
                                                                   NIL)
                                 do (for E in [if (type? NODE J)
                                                  then (fetch (NODE ATMSLABEL)
                                                          of J)
                                                  elseif (type? ASSUMPTION J)
                                                  then (COND
                                                         ((fetch (ASSUMPTION
                                                                    CANCELFLG)
                                                             of J)
                                                           NIL)
                                     do (SETQ ENVIRONMENTS
                                              (CONS (ENV.MERGE ENV E)
                                                    ENVIRONMENTS))
                                     when (for ENTRY bind ANNIHILATOR
                                             in (COND
                                                  ((fetch (ENVIRONMENT ENVCOUNT)
                                                      of ENV)
                                                    (* A non-temporary environment)
                                                    (RPLACA SCRATCH
                                                            (fetch
                                                              (ENVIRONMENT
```

```
                                                      BITVECTOR)
                                                  of ENV)))
                                 (T (fetch (ENVIRONMENT
                                                      BITVECTOR)
                                                  of ENV)))
                            always
                             [SETQ ANNIHILATOR
                                (COND
                                  ((type? ASSUMPTION E)
                                    (fetch (ASSUMPTION DESTROYERS)
                                       of E))
                                  (T (fetch (ENVIRONMENT
                                                      ANNIHILATOR)
                                                  of E]
                              (COND
                                ((NUMBERP ENTRY)
                                  (NOT (TEST.BITVECTOR
                                                  ANNIHILATOR
                                                          ENTRY)))
                                (T (DISJOINT.VECTOR ENTRY
                                                  ANNIHILATOR]
                  finally [for ENVIR in ENVIRONMENTS
                             do (replace (ENVIRONMENT BITVECTOR)
                                   of ENVIR
                                   with (MAKE.COMBINE.BITVECTOR
                                            (fetch (ENVIRONMENT BITVECTOR)
                                                  of ENVIR]
                            (RETURN ENVIRONMENTS])

(CONTRA.UPDATE
  [LAMBDA (NOGOODS ATMS)                              (* Morris "31-Jul-85 15:01")

(* This procedure is charged with removing newly discovered contradictory environments from affected
    labels. It locates the labels by searching for environments which are supersets of the nogoods, and
    following their pointers to associated nodes.)

(for ENVLST on (fetch GOOD.ENVLST of ATMS) bind ENV NG eachtime (SETQ ENV (CAR ENVLST))
       when (SETQ NG (find NOGOOD in NOGOODS suchthat (ENV.SUBSET NOGOOD ENV)))
       do (replace (ENVIRONMENT CONTRADICTORY) of ENV with (fetch (ENVIRONMENT CONTRADICTORY)
                                                                  of NG))
          [for NODE in (fetch IN.NODES of ENV) do (replace (NODE ATMSLABEL) of NODE
                                                    with (DREMOVE ENV (fetch (NODE ATMSLABEL)
                                                                  of NODE]
          (RPLACA ENVLST (QUOTE DELETED)))
    (replace GOOD.ENVLST of ATMS with (DREMOVE (QUOTE DELETED)
                                          (fetch GOOD.ENVLST of ATMS])
(DADD.VECTOR
  [LAMBDA (BITVECTOR BITPOSITION)                     (* Morris "19-Sep-85 17:44")

(* * Takes a bit position and a bitvector, and destructively turns it into a new
    bitvector, represented here as a list of small integers.)

(PROG ((FULLCHUNKS (fetch (BITVECTOR FULLCHUNKS) of BITVECTOR))
           (CHUNKLST (fetch (BITVECTOR CHUNKLST) of BITVECTOR))
           (QUO (IQUOTIENT BITPOSITION BITVECTOR.CHUNKSIZE))
           (NEWCHUNK (MASK.1'S (IMOD BITPOSITION BITVECTOR.CHUNKSIZE)
                           1))
           PTR)
          [COND
            ((IGREATERP QUO FULLCHUNKS)
              (SETQ PTR (LAST CHUNKLST))
              (to (IDIFFERENCE QUO (ADD1 FULLCHUNKS)) by 1
                 do (RPLACD PTR (LIST 0))
                    (SETQ PTR (CDR PTR)))
              (RPLACD PTR (LIST NEWCHUNK))
              (replace (BITVECTOR FULLCHUNKS) of BITVECTOR with QUO))
            (T (SETQ PTR CHUNKLST)
               (to QUO by 1 do (SETQ PTR (CDR PTR)))
               (RPLACA PTR (LOGOR NEWCHUNK (CAR PTR]
          (RETURN BITVECTOR])

(DISJOINT.VECTOR
  [LAMBDA (B1 B2)                                     (* Morris " 2-Oct-85 17:46")

(* * Checks if the set represented by B1 does not intersect the set represented by
    B2.)
```

```
                            (for C1 in (fetch CHUNKLST of B1) as C2 in (fetch CHUNKLST of B2) always (EQ 0 (LOGAND C1 C2)])

(DREM.VECTOR
  [LAMBDA (BITVECTOR BITPOSITION)                              (* Morris " 3-Oct-85 17:35")

(* * Destructively removes a bit position from a bitvector that contains it.)

(PROG ((FULLCHUNKS (fetch (BITVECTOR FULLCHUNKS) of BITVECTOR))
           (CHUNKLST (fetch (BITVECTOR CHUNKLST) of BITVECTOR))
           (QUO (IQUOTIENT BITPOSITION BITVECTOR.CHUNKSIZE))
           (NEWCHUNK (MASK.1'S (IMOD BITPOSITION BITVECTOR.CHUNKSIZE)
                               1))
           PTR)
          [COND
             ((ILEQ QUO FULLCHUNKS)
              (SETQ PTR CHUNKLST)
              (to QUO by 1 do (SETQ PTR (CDR PTR)))
              (RPLACA PTR (BITCLEAR (CAR PTR)
                                    NEWCHUNK]
          (RETURN BITVECTOR])

(ENV.ASSUMPTIONP
  [LAMBDA (ASSUMPTION ENV)                                     (* Morris "13-Aug-85 16:45")

(* * This functions checks to see if the assumption is in the environment.)

(TEST.BITVECTOR (fetch (ENVIRONMENT BITVECTOR) of ENV)
                    (SUB1 (fetch (ASSUMPTION INDEX) of ASSUMPTION])

(ENV.INTERN
  [LAMBDA (E ATMS COMBINEFLG DERIVED.NODE)                     (* Morris " 6-Mar-86 15:44")

(* This procedure enables the ATMS to maintain a unique node for each environment.
    Given an environment, it looks it up in a hash table and returns the canonical version if
    there. Otherwise, it notes it in the table. Also determines whether the environment is
    currently contradictory and caches that information in the node. Puts the node on the ATMS
    GOOD.ENVLST if not found to be contradictory.)

(PROG ((BITVECTOR (fetch BITVECTOR of E))
           (HARRAY (fetch ENVHASH of ATMS))
           (HASHKEY 0)
           HASHVALUE ENV NOGOOD ANNIHILATOR)
          (for CHUNK in (fetch CHUNKLST of BITVECTOR) do (SETQ HASHKEY
                                                              (LOGXOR CHUNK HASHKEY)))
          (SETQ HASHKEY (IMOD (LOGXOR (fetch FULLCHUNKS of BITVECTOR)
                                      HASHKEY)
                              10240))        (* It appears that 10240 is an absolute upper
                                              limit on the number of keys allowed in a hash
                                              array by INTERLISP-D)
          (SETQ HASHVALUE (GETHASH HASHKEY HARRAY))
          [SETQ ENV (find E1 in HASHVALUE suchthat (EQVECTOR BITVECTOR
                                                             (fetch BITVECTOR
                                                                of E1]
          (COND
            (ENV (RETURN ENV)))
          (COND
            ((AND COMBINEFLG (SPECIAL.ENVCHECK E ATMS DERIVED.NODE))
                                               (* An efficiency hack)
             )
            ([AND (NOT COMBINEFLG)
                  (OR (find ANNIHILATOR in (fetch (ENVIRONMENT ANNIHILATOR)
                                               of E)
                            suchthat (NOT (DISJOINT.VECTOR ANNIHILATOR BITVECTOR)))
                      (find INDEX in (GET.INDICES (fetch (ENVIRONMENT BITVECTOR)
                                                      of E))
                            suchthat (fetch (ASSUMPTION CANCELFLG)
                                         of (GETHASH INDEX (fetch (ATMS ASSHASH)
                                                              of ATMS]
             (replace CONTRADICTORY of E with T))
            ((SETQ NOGOOD (SUBSUMED E (fetch NOGOODS of ATMS)))
             (replace CONTRADICTORY of E with (fetch CONTRADICTORY of NOGOOD)))
            ((NEQ DERIVED.NODE (QUOTE FALSE))
             (replace (ENVIRONMENT ANNIHILATOR) of E with (MAKE.COMBINE.BITVECTOR
                                                           (fetch (ENVIRONMENT
```

```
                    (push (fetch GOOD.ENVLST of ATMS)
                          E)))
              (COND
                ((OR (fetch CONTRADICTORY of E)
                     (EQ DERIVED.NODE (QUOTE FALSE)))
                  (replace (ENVIRONMENT ANNIHILATOR) of E with NIL)))
              (PUTHASH HASHKEY (CONS E HASHVALUE)
                       HARRAY)
              (RETURN E])

(ENV.SUBSET
  [LAMBDA (E1 E2)                                       (* Morris " 4-Nov-85 16:01")
                                                        (* Tests if E1 is a subset of E2.
                                                        Uses logic on the associated bit vectors.)

(LET ((N1 (fetch ENVCOUNT of E1))
          (N2 (fetch ENVCOUNT of E2)))
      (COND
        [(AND N1 N2)
          (COND
            ((EQ N1 N2)
              (EQ E1 E2))
            ((ILESSP N1 N2)
              (SUBVECTOR (fetch BITVECTOR of E1)
                         (fetch BITVECTOR of E2]
        (T (SUBVECTOR (fetch BITVECTOR of E1)
                      (fetch BITVECTOR of E2])

(EQVECTOR
  [LAMBDA (V1 V2)                                       (* PHM "11-Mar-85 15:12")
                                                        (* Compares two bitvectors for equali
ty)
    (AND (EQ (fetch FULLCHUNKS of V1)
             (fetch FULLCHUNKS of V2))
         (for C1 in (fetch CHUNKLST of V1) as C2 in (fetch CHUNKLST of V2) always (EQ C1 C2])

(CREATE.ASSUMPTION
  [LAMBDA (EXCLUDERS EXTERNAL)                          (* Morris "28-Oct-85 15:48")

(* Creates an ATMS assumption. EXCLUDERS is an optional exclusion set record.
    Assumptions in the same exclusion set repel each other in the sense that a consistent environment
    may not have more than one of them. EXCLUDERS may be also be a list of exclusion sets.)

(PROG ((INDEX (add (fetch (ATMS COUNT) of ATMS)
                       1))
           ASSUMPTION EXCLUDERELEMENTS)
          [SETQ ASSUMPTION (create ASSUMPTION
                                   INDEX ← INDEX
                                   EXCLUDERS ←(MKLIST EXCLUDERS)
                                   EXTERNAL ← EXTERNAL
                                   DESTROYERS ←(create BITVECTOR
                                                       FULLCHUNKS ← 0
                                                       CHUNKLST ←(LIST 0]
          (PUTHASH INDEX ASSUMPTION (fetch (ATMS ASSHASH) of ATMS))
          (for EXCLUDER in (fetch (ASSUMPTION EXCLUDERS) of ASSUMPTION)
             do (SETQ EXCLUDERELEMENTS (fetch EXCLUDERELEMENTS of EXCLUDER))
                (for A in EXCLUDERELEMENTS do (ADD.JUSTIFICATION (LIST A ASSUMPTION)
                                                                 (QUOTE FALSE)
                                                                 (QUOTE EXCLUSION)))
                (replace EXCLUDERELEMENTS of EXCLUDER with (CONS ASSUMPTION EXCLUDERELEMENTS)))
          (RETURN ASSUMPTION])

(CREATE.EXCLUDER
  [LAMBDA (NAME ANCHOR)                                 (* Morris "18-Dec-85 10:43")

(* * Create an excluder record for the ATMS.)

(create EXCLUDER
            EXCLUDERNAME ← NAME
            EXCLUDERINDEX ←(add (fetch (ATMS EXCLUDERCOUNT) of ATMS)
                                1)
            EXCLUDERANCHOR ← ANCHOR])

(CREATE.NODE
  [LAMBDA (DATUM)                                       (* PHM " 5-Mar-85 09:47")
```
                                                          ANNIHILATOR)
                                                       of E)))

```
                                                       (* Creates an ATMS node to hold the
                                                       datum. It does not check for duplicat
es,
                                                       that being the responsibility of the (create NODE                                   problem solver.)
                DATUM ← DATUM])
(ENV.MERGE
  [LAMBDA (ENV E)                                      (* Morris "17-Feb-86 16:12")
                                                       (* This is called by COMBINE.LABELS to add a
n
                                                       environment E from a label to ENV representing
                                                       the environments collected so far.)

(* We originally did a set union of the assumptions. This could be replaced by a bit vector
  union. Another possibility is to just cons E onto ENV (now an ENVlst) and do the union in
  COMBINE.LABELS after ALL the environments have been collected.)

(* We are now trying the last possibility)
    (PROG ((NONTEMPFLG (fetch (ENVIRONMENT ENVCOUNT) of ENV))
           NEW.ASSUMPTIONS BITPOS.OR.VECTOR INDEX ANNIHILATOR)
          [COND
            ((type? ASSUMPTION E)                      (* Justifier is assumption)
              (SETQ INDEX (fetch (ASSUMPTION INDEX) of E))
              (SETQ NEW.ASSUMPTIONS (LIST INDEX))
              (SETQ BITPOS.OR.VECTOR (SUB1 INDEX))
              (SETQ ANNIHILATOR (fetch (ASSUMPTION DESTROYERS) of E)))
            (T (SETQ NEW.ASSUMPTIONS (fetch (ENVIRONMENT ASSUMPTIONS) of E))
                                                       (* Justifier is node)
              (SETQ BITPOS.OR.VECTOR (fetch (ENVIRONMENT BITVECTOR) of E))
              (SETQ ANNIHILATOR (fetch (ENVIRONMENT ANNIHILATOR) of E]
          (RETURN (COND
                    [(OR NEW.ASSUMPTIONS NONTEMPFLG)
                      (create ENVIRONMENT
                              ASSUMPTIONS ← [CONS NEW.ASSUMPTIONS
                                                  (COND
                                                    (NONTEMPFLG
                                                      (LIST (fetch (ENVIRONMENT
                                                                         ASSUMPTIONS)
                                                                   of ENV)))
                                                    (T (fetch (ENVIRONMENT ASSUMPTIONS)
                                                              of ENV]
                              BITVECTOR ← [CONS BITPOS.OR.VECTOR
                                                (COND
                                                  (NONTEMPFLG
                                                    (LIST (fetch (ENVIRONMENT
                                                                       BITVECTOR)
                                                                 of ENV)))
                                                  (T (fetch (ENVIRONMENT BITVECTOR)
                                                            of ENV]
                              ANNIHILATOR ← (CONS ANNIHILATOR
                                                  (COND
                                                    (NONTEMPFLG
                                                      (LIST (fetch (ENVIRONMENT
                                                                         ANNIHILATOR)
                                                                   of ENV)))
                                                    (T (fetch (ENVIRONMENT ANNIHILATOR)
                                                              of ENV]
                    (T ENV])
(ENV.MERGEALL
  [LAMBDA (ENVLST)                                     (* Morris " 6-Nov-85 11:26")

(* * Applies ENV.MERGE to a mixed list of environments and assumptions)

(COND
      ((NULL ENVLST)
        (create ENVIRONMENT))
      (T (ENV.MERGE (ENV.MERGEALL (CDR ENVLST))
                    (LET ((ENV (CAR ENVLST)))
                      (COND
                        ((NUMBERP ENV)
                          (GETHASH ENV (fetch (ATMS ASSHASH) of ATMS)))
                        (T ENV])
```

```
(EXCLUDED
  [LAMBDA (ENV)                                              (* Morris "13-Aug-85 23:06")
                                                             (* This predicate is used to determine if a ne
wly
                                                             constructed environment violates one of the
                                                             exclusion sets.)
    (find ASLST on (fetch ASSUMPTIONS of ENV)
         suchthat (find EX in (fetch EXCLUDERS of (OR (GETHASH (CAR ASLST)
                                                               (fetch (ATMS ASSHASH) of ATMS))
                                                (ERROR "OLD TMS GARBAGE - GET CLEAN WORKSPACE"
)))
                  suchthat (find AS2 in (CDR ASLST) suchthat
                                        (MEMB EX (fetch EXCLUDERS
                                                    of (GETHASH AS2
                                                                (fetch (ATMS ASSHASH)

of ATMS])

(EXTRACT.ANTECEDENTS
  [LAMBDA (JUSTIFICATION)                                    (* Morris "15-Jul-85 15:28")
                                                             (* An interface function for getting
the
                                                             antecedents field from an ATMS
                                                             justification record)
    (APPEND (fetch JUSTIFIERS of JUSTIFICATION])

(EXTRACT.INFORMANT
  [LAMBDA (JUSTIFICATION)                                                  (* PHM "12-Mar-85 11:1
4")
                                                                           (* Interface function
for getting the informant
                                                                           field of an ATMS justi
fication record)
    (fetch INFORMANT of JUSTIFICATION])
(EXTRACT.NODE
  [LAMBDA (JUSTIFICATION)                                                  (* PHM "12-Mar-85 11:1
3")
                                                                           (* An interface functi
on for getting the node field
                                                                           from an ATMS justifica
tion record)
    (fetch JUSTIFICAND of JUSTIFICATION])

(FIRST.BIT
  [LAMBDA (N)                                                (* Morris "11-Aug-85 23:30")

(* * This is an optimized function to find the position of the first non-zero bit
       in a sixteen-bit positive integer)

(COND
      [[NOT (BITTEST N (CONSTANT (MASK.1'S 0 8]
        (COND
          [[NOT (BITTEST N (CONSTANT (MASK.1'S 0 12]
            (COND
              ([NOT (BITTEST N (CONSTANT (MASK.1'S 0 14]
                (COND
                  ([NOT (BITTEST N (CONSTANT (MASK.1'S 0 15]
                    16)
                   (T 15)))
              (T (COND
                   ([NOT (BITTEST N (CONSTANT (MASK.1'S 0 13]
                      14)
                   (T 13]
          (T (COND
               ([NOT (BITTEST N (CONSTANT (MASK.1'S 0 10]
                 (COND
                   ([NOT (BITTEST N (CONSTANT (MASK.1'S 0 11]
                      12)
                   (T 11)))
               (T (COND
                    ([NOT (BITTEST N (CONSTANT (MASK.1'S 0 9]
                       10)
                    (T 9]
      (T (COND
           [[NOT (BITTEST N (CONSTANT (MASK.1'S 0 4]
             (COND
```

```
                    ([NOT (BITTEST N (CONSTANT (MASK.1'S 0 6]
                      (COND
                        ([NOT (BITTEST N (CONSTANT (MASK.1'S 0 7]
                          8)
                        (T 7)))
                    (T (COND
                        ([NOT (BITTEST N (CONSTANT (MASK.1'S 0 5]
                          6)
                        (T 5]
              (T (COND
                    ([NOT (BITTEST N (CONSTANT (MASK.1'S 0 2]
                      (COND
                        ([NOT (BITTEST N (CONSTANT (MASK.1'S 0 3]
                          4)
                        (T 3)))
                    (T (COND
                        ([NOT (BITTEST N (CONSTANT (MASK.1'S 0 1]
                          2)
                        (T 1])
```

(GET.BITVECTOR.ENVIRONMENT
    [LAMBDA (BITVECTOR)                           (* Morris " 6-Mar-86 16:12")

(* * Returns the interned environment corresponding to the bitvector)

(* The list around MAKE.ANNIHILATOR will be
                                                  removed by ENV.INTERN)

(ENV.INTERN [create ENVIRONMENT
                        BITVECTOR ← BITVECTOR
                        ANNIHILATOR ← (LIST (MAKE.ANNIHILATOR
                                            (for INDEX in (GET.INDICES BITVECTOR)
                                              collect (GETHASH INDEX
                                                        (fetch
                                                          (ATMS ASSHASH)
                                                          of ATMS]
                        ATMS])

(GET.CONSEQUENCES
    [LAMBDA (ASSERTION)                           (* Morris "23-Oct-85 11:42")
        (fetch (NODE CONSEQUENCES) of ASSERTION])

(GET.ENV
    [LAMBDA (ASSUMPTIONS)                         (* Morris "15-Aug-85 22:26")

(* * A specialized function that produces a temporary environment from a list of assumptions in
        increasing order)

(create ENVIRONMENT
                BITVECTOR ←(MAKE.BV ASSUMPTIONS])

(GET.ENVIRONMENT
    [LAMBDA (ASSUMPTIONS)                         (* Morris "10-Oct-85 15:35")
                                                  (* Given a list of assumptions, this function
                                                  returns an ATMS environment for use in subse
quent
                                                  queries.)
                                                  (* The LIST around MAKE.ANNIHILATOR w
ill be
                                                  removed by ENV.INTERN)
        (ENV.INTERN (create ENVIRONMENT
                        ASSUMPTIONS ←(SORT (for A in ASSUMPTIONS collect (fetch (ASSUMPTION INDEX)
                                                                            of A))
                                            (FUNCTION IGREATERP))
                        BITVECTOR ←(MAKE.BITVECTOR ASSUMPTIONS)
                        ANNIHILATOR ←(LIST (MAKE.ANNIHILATOR ASSUMPTIONS)))
                        ATMS])

(GET.INDICES
    [LAMBDA (BITVECTOR)                           (* Morris " 3-Oct-85 17:29")
                                                  (* Returns a list of assumption indic
es
                                                  encoded by the bitvector.)
        (for CHUNK in (fetch CHUNKLST of BITVECTOR) as OFFSET from 0 by BITVECTOR.CHUNKSIZE
            bind INDEXLST BITPOS do [until (EQ CHUNK 0)
                                        do (SETQ BITPOS (FIRST.BIT CHUNK))
                                            (push INDEXLST (IPLUS BITPOS OFFSET))
                                            (SETQ CHUNK (LOGAND CHUNK (MASK.0'S 0 BITPOS]
            finally (RETURN INDEXLST])

```
(GET.JUSTIFICATIONS
  [LAMBDA (NODE)                                           (* PHM "29-May-85 16:42")
                                                           (* An interface function that returns list of the ATMS justification record that support a given node)
    (APPEND (fetch JUSTIFICATIONS of NODE])

(GET.NOGOODS
  [LAMBDA (ENVIRONMENT)                                    (* PHM "12-Mar-85 10:59")
                                                           (* An interface function that returns a list of nogoods contained in the given environment)
                                                           (* Maybe should also return exclusion sets?)
    (COND
      ((fetch CONTRADICTORY of ENVIRONMENT)
        (for NG in (fetch NOGOODS of ATMS) collect NG when (ENV.SUBSET NG ENVIRONMENT])

(MAKE.ANNIHILATOR
  [LAMBDA (ASSUMPTIONS)                                    (* Morris "10-Oct-85 10:26")

(* * This function constructs an "annihilator" for a set of assumptions, i.e. a
        bitvector representing the assumptions that are in two element nogoods with the
        given assumptions.)

(COND
      [(NULL ASSUMPTIONS)                                  (* Special cases)
        (CONSTANT (create BITVECTOR
                          FULLCHUNKS ← 0
                          CHUNKLST ←(LIST 0]
      ((NULL (CDR ASSUMPTIONS))
        (fetch (ASSUMPTION DESTROYERS) of (CAR ASSUMPTIONS)))
      (T                                                   (* The general case)
        (for ASSUMPTION in (CDR ASSUMPTIONS) bind VECTOR NEWVECTOR FULLCHUNKS CHUNKLST NEWCHUNKS
PTR
                                      QUO
            first                                          (* initial vector)
              (SETQ VECTOR (fetch (ASSUMPTION DESTROYERS) of (CAR ASSUMPTIONS)))
              (SETQ CHUNKLST (APPEND (fetch (BITVECTOR CHUNKLST) of VECTOR)))
              (SETQ FULLCHUNKS (fetch (BITVECTOR FULLCHUNKS) of VECTOR))
            do (SETQ PTR CHUNKLST)
              (SETQ NEWVECTOR (fetch (ASSUMPTION DESTROYERS) of ASSUMPTION))
              (SETQ NEWCHUNKS (fetch (BITVECTOR CHUNKLST) of NEWVECTOR))
              (SETQ QUO (fetch (BITVECTOR FULLCHUNKS) of NEWVECTOR))
              [COND
                ((IGREATERP QUO FULLCHUNKS)
                  (to FULLCHUNKS
                     do (RPLACA PTR (LOGOR (CAR PTR)
                                            (CAR NEWCHUNKS)))
                        (SETQ PTR (CDR PTR))
                        (SETQ NEWCHUNKS (CDR NEWCHUNKS)))
                  (RPLACA PTR (LOGOR (CAR PTR)
                                      (CAR NEWCHUNKS)))
                  (while (CDR NEWCHUNKS)
                     do (SETQ NEWCHUNKS (CDR NEWCHUNKS))
                        (RPLACD PTR (LIST (CAR NEWCHUNKS)))
                        (SETQ PTR (CDR PTR)))
                  (SETQ FULLCHUNKS QUO))
                (T (for CHUNK in NEWCHUNKS
                      do (RPLACA PTR (LOGOR (CAR PTR)
                                             CHUNK))
                         (SETQ PTR (CDR PTR]
            finally (RETURN (create BITVECTOR
                                    FULLCHUNKS ← FULLCHUNKS
                                    CHUNKLST ← CHUNKLST])

(LOOK
  [LAMBDA NIL                                              (* PHM "12-Mar-85 10:23")
    (MAPHASH (fetch ENVHASH of ATMS)
             (FUNCTION (LAMBDA (X Y)
                         (PRINT X])

(MAKE.BITVECTOR
  [LAMBDA (ASSUMPTIONS)                                    (* Morris " 6-Aug-85 11:23")
                                                           (* Takes a list of assumptions and tu
rns
``` as
```
    (PROG ((FULLCHUNKS 0)
          (CHUNKLST (LIST 0)))
         [for A in ASSUMPTIONS bind BITPOS QUO REM PTR
             do (SETQ BITPOS (SUB1 (fetch INDEX of A)))        (* The code is simpler if bits run fr
om 0
                                                                  on up)
                (SETQ QUO (IQUOTIENT BITPOS BITVECTOR.CHUNKSIZE))
                (SETQ REM (IMOD BITPOS BITVECTOR.CHUNKSIZE))
                (until (IGEQ FULLCHUNKS QUO)
                    do (SETQ CHUNKLST (CONS 0 CHUNKLST))
                       (SETQ FULLCHUNKS (ADD1 FULLCHUNKS)))
                (SETQ PTR CHUNKLST)
                (from FULLCHUNKS to (ADD1 QUO) by -1 do (pop PTR))
                (RPLACA PTR (LOGOR (CAR PTR)
                                   (MASK.1'S REM 1]
         (SETQ CHUNKLST (DREVERSE CHUNKLST))
         (RETURN (create BITVECTOR
                         FULLCHUNKS ← FULLCHUNKS
                         CHUNKLST ← CHUNKLST])

(MAKE.BV
  [LAMBDA (ASSUMPTIONS)                                         (* Morris "15-Aug-85 22:46")

(* * Takes a list of assumptions in increasing order and turns it into a
    bitvector, represented here as a list of small integers.)

(for A in ASSUMPTIONS
        bind (FULLCHUNKS ← 0)
             (CHUNKLST ←(LIST 0))
             (OLDQUO ← 0)
             BITPOS QUO REM PTR
        first (SETQ PTR CHUNKLST)
        do (SETQ BITPOS (SUB1 A))                               (* The code is simpler if bits run fr
om 0
                                                                  on up)
           (SETQ QUO (IQUOTIENT BITPOS BITVECTOR.CHUNKSIZE))
           (SETQ REM (IMOD BITPOS BITVECTOR.CHUNKSIZE))
           (from (ADD1 OLDQUO) to QUO by 1
               do [COND
                     ((NULL (CDR PTR))
                      (RPLACD PTR (LIST 0))
                      (SETQ FULLCHUNKS (ADD1 FULLCHUNKS]
                  (SETQ PTR (CDR PTR)))
           (RPLACA PTR (LOGOR (CAR PTR)
                              (MASK.1'S REM 1)))
           (SETQ OLDQUO QUO)
        finally (RETURN (create BITVECTOR
                                FULLCHUNKS ← FULLCHUNKS
                                CHUNKLST ← CHUNKLST])

(MAKE.COMBINE.BITVECTOR
  [LAMBDA (COMPONENTS)                                          (* Morris "15-Aug-85 20:52")

(* * Takes a list of bit positions and bitvectors, and turns it into a new
    bitvector, represented here as a list of small integers.)

(COND
      [(NULL COMPONENTS)                                        (* Special cases)
       (CONSTANT (create BITVECTOR
                         FULLCHUNKS ← 0
                         CHUNKLST ←(LIST 0]
      ([AND (NULL (CDR COMPONENTS))
            (NOT (NUMBERP (CAR COMPONENTS]
       (CAR COMPONENTS))
      (T                                                        (* The general case)
       (for COMP in COMPONENTS bind VECTOR FULLCHUNKS CHUNKLST NEWCHUNKS PTR QUO
           first                                                (* Try to find an initial vector)
                [SETQ VECTOR (find C in COMPONENTS suchthat (NOT (NUMBERP C]
                (COND
                   (VECTOR (SETQ CHUNKLST (APPEND (fetch (BITVECTOR CHUNKLST) of VECTOR)))
                           (SETQ FULLCHUNKS (fetch (BITVECTOR FULLCHUNKS) of VECTOR)))
                   (T (SETQ CHUNKLST (LIST 0))
```

```
                                (SETQ FULLCHUNKS 0)))
              when (NEQ COMP VECTOR) do [(COND
                                          [(NUMBERP COMP)
                                            (SETQ QUO (IQUOTIENT COMP BITVECTOR.CHUNKSIZE))
                                            [COND
                                              ((IGREATERP QUO FULLCHUNKS)
                                                (SETQ PTR (LAST CHUNKLST))
                                                (to (IDIFFERENCE QUO FULLCHUNKS)
                                                    do (RPLACD PTR (LIST 0))
                                                       (SETQ PTR (CDR PTR)))
                                                (SETQ FULLCHUNKS QUO))
                                              (T (SETQ PTR (NTH CHUNKLST (ADD1 QUO]
                                            (RPLACA PTR (LOGOR (CAR PTR)
                                                               (MASK.1'S (IMOD COMP BITVECTOR.CHUNKS
IZE)
                                                                            1]
                                          (T (SETQ PTR CHUNKLST)
                                             (SETQ NEWCHUNKS (fetch (BITVECTOR CHUNKLST) of COMP))
                                             (SETQ QUO (fetch (BITVECTOR FULLCHUNKS) of COMP))
                                             (COND
                                               ((IGREATERP QUO FULLCHUNKS)
                                                 (to FULLCHUNKS
                                                     do (RPLACA PTR (LOGOR (CAR PTR)
                                                                           (CAR NEWCHUNKS)))
                                                        (SETQ PTR (CDR PTR))
                                                        (SETQ NEWCHUNKS (CDR NEWCHUNKS)))
                                                 (RPLACA PTR (LOGOR (CAR PTR)
                                                                    (CAR NEWCHUNKS)))
                                                 (while (CDR NEWCHUNKS)
                                                    do (SETQ NEWCHUNKS (CDR NEWCHUNKS))
                                                       (RPLACD PTR (LIST (CAR NEWCHUNKS))))
                                                 (SETQ PTR (CDR PTR)))
                                                 (SETQ FULLCHUNKS QUO))
                                               (T (for CHUNK in NEWCHUNKS
                                                     do (RPLACA PTR (LOGOR (CAR PTR)
                                                                           CHUNK))
                                                        (SETQ PTR (CDR PTR]
              finally (RETURN (create BITVECTOR
                                  FULLCHUNKS ← FULLCHUNKS
                                  CHUNKLST ← CHUNKLST])

(MAXBITPOS
  [LAMBDA (N)                                             (* Morris "12-Aug-85 01:11")

(* * This is an optimized function to find the position of the highest non-zero
    bit in a sixteen-bit positive integer)

(COND
    [(IGREATERP N (CONSTANT (MASK.1'S 0 8)))
      (COND
        [(IGREATERP N (CONSTANT (MASK.1'S 0 12)))
          (COND
            ((IGREATERP N (CONSTANT (MASK.1'S 0 14)))
              (COND
                ((IGREATERP N (CONSTANT (MASK.1'S 0 15)))
                  15)
                (T 14)))
            (T (COND
                 ((IGREATERP N (CONSTANT (MASK.1'S 0 13)))
                   13)
                 (T 12]
        (T (COND
             ((IGREATERP N (CONSTANT (MASK.1'S 0 10)))
               (COND
                 ((IGREATERP N (CONSTANT (MASK.1'S 0 11)))
                   11)
                 (T 10)))
             (T (COND
                  ((IGREATERP N (CONSTANT (MASK.1'S 0 9)))
                    9)
                  (T 8]
    (T (COND
         [(IGREATERP N (CONSTANT (MASK.1'S 0 4)))
           (COND
             ((IGREATERP N (CONSTANT (MASK.1'S 0 6)))
               (COND
                 ((IGREATERP N (CONSTANT (MASK.1'S 0 7)))
```

```
                            7)
                         (T 6)))
                    (T (COND
                          ((IGREATERP N (CONSTANT (MASK.1'S 0 6)))
                            6)
                          (T 4]
              (T (COND
                    ((IGREATERP N (CONSTANT (MASK.1'S 0 2)))
                      (COND
                        ((IGREATERP N (CONSTANT (MASK.1'S 0 3)))
                          3)
                        (T 2)))
                    (T (COND
                          ((IGREATERP N (CONSTANT (MASK.1'S 0 1)))
                            1)
                          (T 0])

(MERGE.ASSUMPTIONS
  [LAMBDA (INCREMENTLST)                          (* Morris "29-Jul-85 18:10")

(* * Merges a list of lists of assumptions into a single list, taking care to
        avoid duplication.)

(COND
      ((NULL INCREMENTLST)
        NIL)
      (T (for ASSUMPTION in (CAR INCREMENTLST) bind (OTHERS ←(MERGE.ASSUMPTIONS (CDR INCREMENTLST)
))
          do (SETQ OTHERS (CONS ASSUMPTION OTHERS)) unless (MEMB ASSUMPTION OTHERS)
          finally (RETURN OTHERS])

(Q8
  [LAMBDA NIL                                     (* Morris "14-Oct-85 18:39")
                                                  (* ATMS eight queens test problem -
                                                  set up)
    (for I from 1 to 8 do (for J from 1 to 8 do (SET (PACK* "Q" I J)
                                                     (CREATE.ASSUMPTION])

(Q8.PARE
  [LAMBDA NIL                                     (* Morris "11-Oct-85 09:32")
                                                  (* ATMS eight queens test problem -
                                                  install nogoods)
    (for I from 1 to 7 do (for J from 1 to 8
                            do (for I1 from (ADD1 I) to 8
                                  do (for J1 from 1 to 8
                                        do (COND
                                              ((UNSAFE I J I1 J1)
                                                (ADD.JUSTIFICATION (LIST (EVAL (PACK* (QUOTE Q)
                                                                                 I J))
                                                                         (EVAL (PACK* (QUOTE Q)
                                                                                 I1 J1)))
                                                                   (QUOTE FALSE])

(Q8.RESET
  [LAMBDA NIL                                     (* Morris " 5-Nov-85 10:21")
    (for I to 8 while (BOUNDP (PACK* "Q" I))
       do (create NODE smashing (EVAL (PACK* "Q" I)))
          [for J to 8 do (create ASSUMPTION smashing (EVAL (PACK* "Q" I J]
       finally (INITIALIZE.KEEWORLDS!])

(Q8.SOLS
  [LAMBDA NIL                                     (* Morris "27-Jun-85 14:44")
                                                  (* ATMS eight queens test problem -
                                                  construct solutions)
    (SETQ Q1 (create NODE
                     DATUM ←(QUOTE Q1)))
    (for J from 1 to 8 do (ADD.JUSTIFICATION (LIST (EVAL (PACK* "Q1" J)))
                                             Q1))
    (for I from 2 to 8
       do (SET (PACK* "Q" I)
               (create NODE
                       DATUM ←(PACK* "Q" I)))
          (for J from 1 to 8 do (ADD.JUSTIFICATION (LIST (EVAL (PACK* "Q" (SUB1 I)))
                                                         (EVAL (PACK* "Q" I J)))
                                                   (EVAL (PACK* "Q" I])
```

```
(SIMPLIFY.ENVLST
  [LAMBDA (OLDLABEL DERIVED.NODE ATMS ENVLST)            (* Morris "11-Nov-85 15:08")

(* This simplifies a list of environments by removing those which are contradictory, or subsumed by
    others in the list, or by others in the old label.)

(* It also replaces temporary environments by
                                                         ones duly noted (INTERNed) by the ATMS)
    (for E in ENVLST bind NEW.ENVLST ENV do (SETQ NEW.ENVLST (CONS ENV NEW.ENVLST))
         unless (OR (fetch CONTRADICTORY of (SETQ ENV (ENV.INTERN E ATMS T DERIVED.NODE)))
                    (SUBSUMED E OLDLABEL)
                    (SUBSUMED E NEW.ENVLST))
         finally (RETURN NEW.ENVLST])

(SINGLETON.NOGOOD
  [LAMBDA (ENV ATMS)                                     (* Morris " 5-Mar-86 15:03")

(* * This is a predicate, used for checking new nogoods, that returns true if ENV is a
    singleton environment, i.e. contains a single assumption. In that case it also marks the
    assumption as cancelled so that future environments containing it will be automatically
    discarded, and does some other cleaning up.)

(PROG ((ASSUMPTIONS (fetch (ENVIRONMENT ASSUMPTIONS) of ENV))
           SINGLE.ASSUMPTION SINGLE.ASS)
          (COND
            ((EQLENGTH ASSUMPTIONS 1)
             (SETQ SINGLE.ASS (CAR ASSUMPTIONS))
             (for NG2 in (fetch (ATMS NOGOODS2) of ATMS) do (SUBSUMPTION.DAEMON
                                                                    NG2
                                                                    (QUOTE FALSE))
                  when (MEMB SINGLE.ASS (fetch (ENVIRONMENT ASSUMPTIONS) of NG2)))
             (SETQ SINGLE.ASSUMPTION (GETHASH SINGLE.ASS (fetch (ATMS ASSHASH)
                                                                 of ATMS)))
             (replace CANCELFLG of SINGLE.ASSUMPTION with T)
             (push (fetch (ATMS NOGOODS1) of ATMS)
                   ENV)
             (RETURN T])

(SPECIAL.ENVCHECK
  [LAMBDA (E ATMS DERIVED.NODE)                          (* Morris " 4-Nov-85 15:52")

(* * This does some special checking for contradictory environments. It tries to take advantage of
    special cases to avoid doing a complete search of the nogood data base.)

(PROG ((INCREMENTLST (fetch (ENVIRONMENT ASSUMPTIONS) of E))
           NEW.ASSUMPTION NEW.ASSUMPTIONLST)
          (COND
            ((AND (EQLENGTH INCREMENTLST 2)
                  (EQLENGTH (CAR INCREMENTLST)
                            1))
             (SETQ NEW.ASSUMPTION (GETHASH (CAAR INCREMENTLST)
                                           (fetch (ATMS ASSHASH) of ATMS)))
             (COND
               ((SUBSUMED E (fetch (ASSUMPTION NOGOODLST) of NEW.ASSUMPTION))
                (replace CONTRADICTORY of E with T))
               ((NEQ DERIVED.NODE (QUOTE FALSE))
                (replace (ENVIRONMENT ANNIHILATOR) of E with (MAKE.COMBINE.BITVECTOR
                                                                    (fetch (ENVIRONMENT ANNIHILATOR)
                                                                           of E)))
                (push (fetch GOOD.ENVLST of ATMS)
                      E)))
             [replace (ENVIRONMENT ASSUMPTIONS) of E with (SETQ NEW.ASSUMPTIONLST
                                                                 (for LST on (CADR INCREMENTLST)
                                                                      bind ELT PTR NEWLST
                                                                           (INC ←(CAAR INCREMENTLST))
                                                                      first (SETQ PTR (SETQ NEWLST
                                                                                            (LIST INC)))
                                                                      until (IGEQ INC (SETQ ELT
                                                                                            (CAR LST)))
                                                                      do (RPLACA PTR ELT)
                                                                         (RPLACD PTR (LIST INC))
                                                                         (SETQ PTR (CDR PTR))
                                                                      finally (RPLACD PTR LST)
                                                                              (RETURN NEWLST]
```

```
            (replace (ENVIRONMENT ENVCOUNT) of E with (LENGTH NEW.ASSUMPTIONLST))
            (RETURN T))
          (T [replace (ENVIRONMENT ASSUMPTIONS) of E with (SETQ NEW.ASSUMPTIONLST
                                                           (GET.INDICES (fetch (ENVIRONMENT
                                                                                 BITVECTOR)
                                                                                                of E]
            (replace (ENVIRONMENT ENVCOUNT) of E with (LENGTH NEW.ASSUMPTIONLST]))

(SUBSUMED
  [LAMBDA (ENV ENVLST)                                    (* PHM " 4-Mar-85 11:5
5")
                                                          (* This checks to see
if ENV is a superset of some
                                                          existing environment i
n ENVLST)
    (find E in ENVLST suchthat (ENV.SUBSET E ENV])

(SUBSUMPTION.DAEMON
  [LAMBDA (SUBSUMED.ENV NODE)                             (* PHM "24-May-85 17:24")

(* * This daemon is called whenever an environment gets removed because of
        subsumption. It provides a good place to hang various consumers.)

(COND
      ((EQ NODE (QUOTE FALSE))
        (for DEMON in (fetch (ATMS NOT.SO.BAD.DEMONS) of ATMS) do (APPLY* DEMON SUBSUMED.ENV])

(SUBVECTOR
  [LAMBDA (B1 B2)                                         (* PHM " 4-Jun-85 17:34")
                                                          (* Checks if the set represented by B
1 is
                                                          contained in the set represented by B
2.)
    (AND (ILEQ (fetch FULLCHUNKS of B1)
               (fetch FULLCHUNKS of B2))
         (for C1 in (fetch CHUNKLST of B1) as C2 in (fetch CHUNKLST of B2)
            always (EQ C1 (LOGAND C1 C2])
(TEST.BITVECTOR
  [LAMBDA (BITVECTOR BITPOS)                              (* Morris "13-Aug-85 17:15")

(* * Tests if the bit is on in the bitvector.)

(AND (ILEQ (IQUOTIENT BITPOS BITVECTOR.CHUNKSIZE)
               (fetch (BITVECTOR FULLCHUNKS) of BITVECTOR))
         (BITTEST [CAR (NTH (fetch (BITVECTOR CHUNKLST) of BITVECTOR)
                            (ADD1 (IQUOTIENT BITPOS BITVECTOR.CHUNKSIZE]
                  (MASK.1'S (IMOD BITPOS BITVECTOR.CHUNKSIZE)
                            1])

(TEST.NOTION
  [LAMBDA (ENVIRONMENT NOTION)                            (* Morris " 7-Aug-85 10:17")
                                                          (* An interface function that determines wheth
er
                                                          a node/assumption is IN for a given environm
ent)
    (COND
      ((fetch CONTRADICTORY of ENVIRONMENT)
        "Contradictory Environment")
      ((type? ASSUMPTION NOTION)
        (MEMB (fetch (ASSUMPTION INDEX) of NOTION)
              (fetch ASSUMPTIONS of ENVIRONMENT)))
      ((type? NODE NOTION)
        (find ENV in (fetch (NODE ATMSLABEL) of NOTION) suchthat (ENV.SUBSET ENV ENVIRONMENT])

(UNINDEX.JUSTIFICATION
  [LAMBDA (JUSTIFICATION)                                 (* Morris " 5-Mar-86 15:02")
    (LET ((JUSTIFICAND (fetch (JUSTIFICATION JUSTIFICAND) of JUSTIFICATION)))
         (replace (NODE JUSTIFICATIONS) of JUSTIFICAND with (DREMOVE
                                                             JUSTIFICATION
                                                             (fetch (NODE
                                                                      JUSTIFICATIONS)
                                                                    of JUSTIFICAND)))

(for JUSTIFIER in (fetch JUSTIFIERS of JUSTIFICATION)
            do (replace (NODE CONSEQUENCES) of JUSTIFIER
                  with (DREMOVE JUSTIFICATION (fetch (NODE CONSEQUENCES) of JUSTIFIER))
```

```
                              )
          when (type? NODE JUSTIFIER])

(UPDATE.LABELS
    [LAMBDA (JUSTIFICATION ATMS GOOD.DAEMON)              (* Morris " 4-Mar-86 11:33")

(* This updates the label on the derived node to reflect the effect of the Justification.
    It then calls itself recursively on justifications in which that node is a justifier, so that
    the label updating gets propagated upwards. Adds any contradictions it discovers to the
    NEW.NOGOODS list, and updates affected labels.)

(PROG ((DERIVED.NODE (fetch JUSTIFICAND of JUSTIFICATION))
            OLDLABEL NEW.ENVIRONMENTS)                    (* and NEW.NOGOODS is a SPECVAR bound in ADD.JUSTIFICATION)
        (SETQ OLDLABEL (if (EQ DERIVED.NODE (QUOTE FALSE))
                           then NIL
                           else (fetch (NODE ATMSLABEL) of DERIVED.NODE)))
        (SETQ NEW.ENVIRONMENTS (COMBINE.LABELS (fetch JUSTIFIERS of JUSTIFICATION)
                                               OLDLABEL ATMS DERIVED.NODE))
        (COND
            ((NULL NEW.ENVIRONMENTS)

(RETURN)))                                        (* No work to do. Less obviously, it prevents
                                                          infinite loops due to cycles in the derivation
                                                          graph.)
        (if (EQ DERIVED.NODE (QUOTE FALSE))
            then [for NG in NEW.ENVIRONMENTS do (COND ((NOT (fetch (ENVIRONMENT
                                                                  ASSUMPTIONS)
                                                          of NG))

(* * Old Code (ERROR "PREMISE INCONSISTENCY" NG))

]
        (replace NOGOODS of ATMS with (ADD.ENVIRONMENTS (fetch NOGOODS
                                                              of ATMS)
                                                       NEW.ENVIRONMENTS
                                                       DERIVED.NODE ATMS)
                )
        (for NG in NEW.ENVIRONMENTS
             do [LET ((ASSUMPTIONS (fetch (ENVIRONMENT ASSUMPTIONS)
                                          of NG)))
                    (COND
                        [(EQLENGTH ASSUMPTIONS 2)
                         (DADD.VECTOR (fetch (ASSUMPTION DESTROYERS)
                                             of (GETHASH (CAR ASSUMPTIONS)
                                                         (fetch (ATMS ASSHASH)
                                                                of ATMS)))
                                      (SUB1 (CADR ASSUMPTIONS)))
                         (DADD.VECTOR (fetch (ASSUMPTION DESTROYERS)
                                             of (GETHASH (CADR ASSUMPTIONS)
                                                         (fetch (ATMS ASSHASH)
                                                                of ATMS)))
                                      (SUB1 (CAR ASSUMPTIONS)]
                        (T (for ASSUMPTION in ASSUMPTIONS
                                do (push (fetch (ASSUMPTION NOGOODLST)
                                                of (GETHASH ASSUMPTION
                                                            (fetch
                                                              (ATMS ASSHASH)
                                                              of ATMS)))
                                         NG]
                    (replace (ENVIRONMENT CONTRADICTORY) of NG with
                                                         JUSTIFICATION))
        (pushlist NEW.NOGOODS NEW.ENVIRONMENTS)
        (CONTRA.UPDATE NEW.ENVIRONMENTS ATMS)
        else (replace (NODE ATMSLABEL) of DERIVED.NODE
                with (ADD.ENVIRONMENTS (fetch (NODE ATMSLABEL) of DERIVED.NODE)
                                       NEW.ENVIRONMENTS DERIVED.NODE ATMS))
             (for E in NEW.ENVIRONMENTS
                  do (push (fetch IN.NODES of E)
                           DERIVED.NODE)
                     (if GOOD.DAEMON
                         then (APPLY* GOOD.DAEMON DERIVED.NODE E)))
             (for J in (fetch CONSEQUENCES of DERIVED.NODE)
                  do (UPDATE.LABELS J ATMS GOOD.DAEMON)
```

(** The recursive updating might be made more efficient by passing the DERIVED.NODE's NEW.ENVIRONMENTS in such a way that only the increments are propagated upwards.)

])

(\EXTRACT.ANTECEDENTS
  [LAMBDA (JUSTIFICATION)                           (* Morris "15-Jul-85 15:29")
                                                    (* An interface function for getting
the
                                                    antecedents field from an ATMS
                                                    justification record)
    (fetch (JUSTIFICATION JUSTIFIERS) of JUSTIFICATION])

(\GET.ATMS.LABEL
  [LAMBDA (ASSERTION)                               (* Morris "12-Jul-85 12:59")

(** Returns the list of environments for the assertion. *CAUTION* The list is not
        copied; be careful not to smash it.)

(fetch (NODE ATMSLABEL) of ASSERTION])

(\GET.JUSTIFICATIONS
  [LAMBDA (NODE)                                    (* Morris "12-Jul-85 12:05")
                                                    (* An interface function that returns
a
                                                    list of the ATMS justification record
s
                                                    that support a given node)
    (fetch JUSTIFICATIONS of NODE]))
(DECLARE: EVAL@COMPILE (CONSTANTS BITVECTOR.CHUNKSIZE)
(RPAQ BITVECTOR.CHUNKSIZE (INTEGERLENGTH MAX.SMALLP))
)
(DECLARE: EVAL@COMPILE
[PUTPROPS FIRST.BIT DMACRO
          ((N)
           (* Morris "11-Aug-85 23:19")
           (** This is an optimized function to find the position of the first non-zero bit in
               a sixteen-bit positive integer)
           (COND [[NOT (BITTEST N (CONSTANT (MASK.1'S 0 8]
                   (COND [[NOT (BITTEST N (CONSTANT (MASK.1'S 0 12]
                           (COND ([NOT (BITTEST N (CONSTANT (MASK.1'S 0 14]
                                   (COND ([NOT (BITTEST N (CONSTANT (MASK.1'S 0 15]
                                           16)
                                         (T 15)))
                                 (T (COND ([NOT (BITTEST N (CONSTANT (MASK.1'S 0 13]
                                            14)
                                          (T 13]
                         (T (COND ([NOT (BITTEST N (CONSTANT (MASK.1'S 0 10]
                                    (COND ([NOT (BITTEST N (CONSTANT (MASK.1'S 0 11]
                                            12)
                                          (T 11)))
                                  (T (COND ([NOT (BITTEST N (CONSTANT (MASK.1'S 0 9]
                                             10)
                                           (T 9]
                 (T (COND [[NOT (BITTEST N (CONSTANT (MASK.1'S 0 4]
                            (COND ([NOT (BITTEST N (CONSTANT (MASK.1'S 0 6]
                                    (COND ([NOT (BITTEST N (CONSTANT (MASK.1'S 0 7]
                                            8)
                                          (T 7)))

(T (COND ([NOT (BITTEST N (CONSTANT (MASK.1'S 0 5]
                                             6)
                                           (T 5]
                          (T (COND ([NOT (BITTEST N (CONSTANT (MASK.1'S 0 2]
                                     (COND ([NOT (BITTEST N (CONSTANT (MASK.1'S 0 3]
                                             4)
                                           (T 3)))
                                   (T (COND ([NOT (BITTEST N (CONSTANT (MASK.1'S 0 1]
                                              2)
                                            (T 1]
)
(PUTPROPS ATMS COPYRIGHT ("IntelliCorp" 1985 1900 1986))
(DECLARE: DONTCOPY

```
(FILEMAP (NIL (3459 50716 (ADD.ENVIRONMENTS 3469 . 4434) (DOUBLETON.NOGOOD 4436 . 5804) (
ADD.JUSTIFICATION 6806 . 7534) (COMBINE.LABELS 7536 . 10517) (CONTRA.UPDATE 10519 . 11648) (
DADD.VECTOR 11650 . 12613) (DISJOINT.VECTOR 12615 . 12924) (DREM.VECTOR 12926 . 13587) (
ENV.ASSUMPTIONP 13589 . 13933) (ENV.INTERN 13935 . 16705) (ENV.SUBSET 16707 . 17362) (EQVECTOR
17364 . 17719) (CREATE.ASSUMPTION 17721 . 19033) (CREATE.EXCLUDER 19035 . 19374) (CREATE.NODE
19376 . 19744) (ENV.MERGE 19746 . 22095) (ENV.MERGEALL 22097 . 22574) (EXCLUDED 22576 . 23389) (
EXTRACT.ANTECEDENTS 23391 . 23731) (EXTRACT.INFORMANT 23733 . 24070) (EXTRACT.NODE 24072 . 24406)
 (FIRST.BIT 24408 . 25729) (GET.BITVECTOR.ENVIRONMENT 25731 . 26405) (GET.CONSEQUENCES 26407 .
26576) (GET.ENV 26578 . 26894) (GET.ENVIRONMENT 26896 . 27686) (GET.INDICES 27688 . 28247) (
GET.JUSTIFICATIONS 28249 . 28592) (GET.NOGOODS 28594 . 29160) (MAKE.ANNIHILATOR 29162 . 31052) (
LOOK 31054 . 31227) (MAKE.BITVECTOR 31229 . 32237) (MAKE.BV 32239 . 33216) (
MAKE.COMBINE.BITVECTOR 33218 . 35626) (MAXBITPOS 35628 . 36935) (MERGE.ASSUMPTIONS 36937 . 37413)
 (Q8 37415 . 37726) (Q8.PARE 37728 . 38271),(Q8.RESET 38273 . 38663) (Q8.SOLS 38665 . 39280) (
SIMPLIFY.ENVLST 39282 . 40068) (SINGLETON.NOGOOD 40070 . 41216) (SPECIAL.ENVCHECK 41218 . 43261)
(SUBSUMED 43263 . 43598) (SUBSUMPTION.DAEMON 43600 . 43993) (SUBVECTOR 43995 . 44425) (
TEST.BITVECTOR 44427 . 44873) (TEST.NOTION 44875 . 45649) (UNINDEX.JUSTIFICATION 45551 . 46247) (
UPDATE.LABELS 46249 . 49735) (\EXTRACT.ANTECEDENTS 49737 . 50086) (\GET.ATMS.LABEL 50088 . 50373)
 (\GET.JUSTIFICATIONS 50375 . 50714)))))
STOP
```

We claim:

1. In an artificial intelligence worlds mechanism implemented on a computer system, said worlds mechanism containing a graph of worlds, each one of said worlds having associated therewith a first set of assertions, said first set of assertions being determined from a second set of assertions inherited from ancestor worlds together with additions and deletions specific to each one of said worlds, and each said world having a method for testing if an assertion is properly within said first set of assertions, a method for creating worlds comprising:

creating a graph of worlds by employing an assumption-based truth maintenance system (ATMS), said ATMS comprising in combination an ATMS tool for carrying out ATMS procedures and an ATMS database comprising a collection of assumptions; and thereafter constructing justifications between said worlds by means of said ATMS, wherein a justification is a data structure representing derivation steps linking an assertion with other assertions and/or assumptions such that assertions and/or assumptions are in a conditions so they can be arbitrarily deleted.

2. The method according to claim 1 wherein said graph of worlds includes world assumptions and world assertions and wherein said justifications constructing step comprises constructing justifications between said world assumptions and said world assertions.

3. In an artificial intelligence worlds mechanism implemented on a computer system, said worlds mechanism containing a graph of worlds, each one of said worlds having associated therewith a first set of assertions, a world assumption comprising an assumption about a world and a world environment comprising an environment for a world, said first set of assertions being determined from a second set of assertions inherited from ancestor worlds together with additions and deletions specific to each one of said worlds, and each said world having a method for testing if an assertion is properly within said first set of assertions, said world mechanism employing an assumption-based truth maintenance system (ATMS), said ATMS comprising in combination an ATMS tool for carrying out ATMS procedures and an ATMS database comprising a collection of assumptions, to create a graph of worlds and to effect additions and deletions of assertions and wherein an assertion has been added after creation of said each said world, a method for providing for deletion of an assertion at another world comprising:

creating a distinct nondeletion assumption for each said added assertion at each world where an assertion has been added; and thereafter constructing a justification from the world assertion of said each said world and said distinct nondeletion assumption to said assertion to be deleted so that said assertion to be deleted can be arbitrarily deleted.

4. A method according to claim 3 further for deleting an added assertion comprising:

thereafter supplying from said world environment to the ATMS a justification from the world assumption and the nondeletion assumption to a "false"-type assertion in order to cause the ATMS tool to update the ATMS database; and only thereafter deleting said added assertion.

5. A method according to claim 4 further for determining if a nondeletion assumption is relevant to deletion of an added assertion comprising:

thereafter testing whether an adding world corresponding to said nondeletion assumption is an ancestor of the deleting world of said deletion.

6. A method according to claim 4 further for determining if a nondeletion assumption is relevant to deletion of an added assertion comprising thereafter:

testing whether an adding world corresponding to said nondeletion assumption is not an ancestor of the deleting world of said deletion;

testing whether said adding world is not said deleting world;

testing whether said adding world is not a descendant of said deleting world; and testing whether a pessimistic merge is in effect, a pessimistic merge being a merge in which an assertion is inherited from an ancestor world unless there has been some deletion of said assertion by an ancestor of said adding world.

7. In an artificial intelligence worlds mechanism implemented on a computer system, said worlds mechanism containing a graph of world, each one of said worlds having associated therewith a first set of assertions, said first set of assertions being determined from a second set of assertions inherited from ancestor worlds and from additions and deletions specific to each one of said worlds, and each said world having a method for testing if an assertion is properly within said first set of assertions, a method for representing a directed acyclic graph of worlds comprising:

constructing a link between assumption-based truth maintenance system (ATMS) assumption and each said world, wherein an ATMS assumption is an elementary stipulation of an assumption-based truth maintenance system; and thereafter constructing a connection between an ATMS environment and each said world, wherein said ATMS environment comprises said ATMS assumption of said each said world and said ATMS assumptions of all ancestor worlds of said each said world.

8. In an artificial intelligence worlds mechanism implemented on a computer system, said worlds mechanism containing a graph of worlds, said mechanism employing an assumption-based truth maintenance system (ATMS) to create a graph of worlds and to effect additions and deletions of assertions, wherein said ATMS comprises an ATMS tool for performing ATMS procedures and an ATMS data base, said ATMS data base comprising assertions, and a "false"-type assertion, each assertion having a label, wherein a label consists of zero, one or a plurality of assertion environments, an assertion environment providing a mechanism for associating said each assertion with a world, said assertion environment consisting of world assumptions and nondeletion assumptions, wherein an assumption is an elementary stipulation, a world assumption is an elementary stipulation of existence of a world and a nondeletion assumption is an elementary stipulationn of the presence of an assertion in a world, said "false"-type assertion having a label consisting environments called nogoods, nogoods being minimal inconsistent sets of assumptions, one type of nogood being a deletion nogood, a deletion nogood consisting of only one nondeletion assumption and either none or one world assumption, a method for testing a specific assertion at said each said world comprising:

for each environment in said label of said specific assertion, determining if all said world assumptions of said specific assertion are present in said world environment by comparing said world assumptions of said specific assertion with said world assumptions of said world environment; and thereafter determining if nondeletion assumptions are not in any deletion nogood with world assumptions said world environment by comparing said nondeletion assumptions of said specific assertion with the nondeletion assumption in each said deletion nogood while comping said world assumptions in said world environment with world assumption in said deletion nogood.

9. In an artificial intelligence worlds mechanism implemented on a computer system, said worlds mechanism containing a graph of worlds, said worlds mechanism employing an assumption-based truth maintenance system (ATMS) to create a graph of worlds and to effect additions and deletions of assertions, wherein said ATMS comprises an ATMS tool for performing ATMS procedures and an ATMS data base, said ATMS data base comprising assertions, and a "false"-type assertion, a world having an assertion with a label, wherein a label consists of zero, one or a plurality of environments, a method for determining if said world is internally consistent comprising:

removing environments from the label of said world upon derivation of said "false"-type assertion in said world; and thereafter determining if any environments are present in said label of said world by examining the label of the world assertion of said world.

10. In an artificial intelligence worlds mechanism containing a graph of worlds, said worlds mechanism implemented on a computer system, said worlds mechanism employing an assumption-based truth maintenance system (ATMS) to create a graph of worlds and to effect additions and deletions of assertions, wherein said ATMS comprises an ATMS tool for performing ATMS procedures and an ATMS data base, said ATMS data base comprising assertions, and a "false"-type assertion, each assertion having a label, wherein a label consists of zero, one or a plurality of assertion environments, an assertion environment providing a mechanism for associating said each assertion with a world, said assertion environment consisting of world assumptions and nondeletion assumptions, wherein an assumption is an elementary stipulation, a world assumption is an elementary stipulation of existence of a world and a nondeletion assumption is an elementary stipulation of the presence of an assertion in a world, said "false"-type assertion having a label consisting environments called nogoods, nogoods being minimal inconsistent sets of assumptions, one type of nogood being a deletion nogood, a deletion nogood consisting of only one nondeletion assumption and either none or one world assumption, a method for determining if said world is internally consistent comprising:

removing environments from the label of said world upon derivation of said "false"-type assertion in said world by applying a feedback procedure, said feedback procedure comprising:

filtering said nogoods other than said deletion nogoods in said label of said "false"-type assertion for world assumptions and thereafter adding to said ATMS data base a justification from said world assumptions to said "false"-type assertion to cause said ATMS tool to generate nogoods containing only world assumptions, which in turn causes said ATMS tool to remove environments from said label; and thereafter.

determining if any environments are present in said label of said world by examining the label of the world assertion of said world.

* * * * *